(12) United States Patent
Kelley

(10) Patent No.: US 10,315,164 B2
(45) Date of Patent: Jun. 11, 2019

(54) NANOSCALE GASEOUS MATERIAL FILTERING AND PUMPING SYSTEMS AND METHODS OF USE THEREOF

(71) Applicant: William A. Kelley, Austin, TX (US)

(72) Inventor: William A. Kelley, Austin, TX (US)

(*) Notice: Subject to any disclaimer, the term of this patent is extended or adjusted under 35 U.S.C. 154(b) by 0 days.

(21) Appl. No.: 15/417,862

(22) Filed: Jan. 27, 2017

(65) Prior Publication Data

US 2017/0361274 A1 Dec. 21, 2017

Related U.S. Application Data

(63) Continuation-in-part of application No. 13/856,344, filed on Apr. 3, 2013, now abandoned.

(51) Int. Cl.
*B01D 19/00* (2006.01)
*B01D 61/02* (2006.01)
(Continued)

(52) U.S. Cl.
CPC .......... *B01D 61/027* (2013.01); *B01D 61/08* (2013.01); *B01D 69/08* (2013.01); *B01D 71/021* (2013.01); *F04B 19/006* (2013.01); *F04B 19/24* (2013.01); *B01D 2201/184* (2013.01); *B01D 2311/103* (2013.01); *B01D 2325/06* (2013.01); *B01D 2325/08* (2013.01); *B82Y 30/00* (2013.01); *Y10S 977/742* (2013.01); *Y10S 977/902* (2013.01); *Y10T 137/7976* (2015.04)

(58) Field of Classification Search
CPC .... B01D 53/22; B01D 53/228; B01D 71/021; B01D 61/027; B01D 69/08; B01D 61/08; B01D 2201/184; B01D 2311/103; B01D 2325/08; B01D 2325/06

See application file for complete search history.

(56) References Cited

U.S. PATENT DOCUMENTS 6,649,327 B2   11/2003   Kim et al.
7,341,955 B2   3/2008    Nam
(Continued)

OTHER PUBLICATIONS

S. Fan, "Self Oriented Regular Arrays of Carbon Nanotubes and Their Field Emission Properties," Science 283, 512 (1999).
(Continued)

*Primary Examiner* — Dung H Bui
(74) *Attorney, Agent, or Firm* — Dickinson Wright PLLC; Ross Spencer Garsson

(57) ABSTRACT

Nano filtering and pumping systems and methods of use thereof for nanoscale gaseous materials by utilizing materials having nanosized perforations through the materials. The perforations generally have an inner diameter similar to that of nanotubes, and in some embodiments, carbon nanotubes are disposed within the perforations. Such materials can partially organize molecules in random motion to move either some selectively or all of them, to create pressure differences and hence motive forces, or cause air flow into pressurized area. Because air is a cloud of particles separated by vacuum, the systems and method in air can be used to create motive force pushing any form of vehicle, lifting force for any form of air vehicle, air compression, power source for any form of machine, conveyor or generator, using the solar energy stored in the air in the form of heat, 24 hours a day, worldwide.

19 Claims, 27 Drawing Sheets

(51) Int. Cl.
*B01D 61/08* (2006.01)
*B01D 69/08* (2006.01)
*B01D 71/02* (2006.01)
*F04B 19/00* (2006.01)
*F04B 19/24* (2006.01)
*B82Y 30/00* (2011.01)

(56) References Cited

U.S. PATENT DOCUMENTS

| | | | |
|---|---|---|---|
| 7,922,795 B2 | 4/2011 | Striemer et al. | |
| 7,981,177 B2 | 7/2011 | Ogale | |
| 9,431,219 B1 | 8/2016 | Cushen et al. | |
| 2003/0186405 A1* | 10/2003 | Lee | A61K 9/0097 435/182 |
| 2005/0238567 A1 | 10/2005 | Sunkara et al. | |
| 2006/0157747 A1 | 7/2006 | Majumdar et al. | |
| 2007/0243554 A1 | 10/2007 | Jagota et al. | |
| 2009/0293953 A1 | 12/2009 | Usui et al. | |
| 2010/0098877 A1 | 4/2010 | Cooper et al. | |
| 2011/0186775 A1 | 8/2011 | Shah et al. | |
| 2012/0107465 A1 | 5/2012 | Nguyen et al. | |
| 2013/0086876 A1 | 4/2013 | Ikeda et al. | |
| 2013/0171512 A1 | 7/2013 | Rojeski | |
| 2013/0203917 A1 | 8/2013 | Harris et al. | |
| 2013/0260371 A1 | 10/2013 | Holt | |
| 2013/0260472 A1 | 10/2013 | Holt | |
| 2014/0298762 A1* | 10/2014 | Kelley | F04B 19/006 55/468 |

OTHER PUBLICATIONS

J. G. Wen et. al., "Growth and characterization of aligned carbon nanotubes from patterned nickel nanodots and uniform thin films," J. Mater. Res. 16(11), 3246 (2001).

K. Jiang et al., "Spinning continuous carbon nanotube yarns," Nature 419, 801 (2002).

* cited by examiner

NANOSCALE GASEOUS MATERIAL FILTERING AND PUMPING SYSTEMS AND METHODS OF USE THEREOF

CROSS REFERENCE TO RELATED APPLICATION

This application is a continuation-in-part and claims priority to U.S. patent application Ser. No. 13/856,344, filed Apr. 3, 2013, entitled "Nano Filter Pump." This patent application is commonly owned by the inventor of the present invention and is hereby incorporated herein by reference in its entirety for all purposes.

FIELD OF INVENTION

The present invention relates to filtering and pumping systems and methods of use thereof for nanoscale gaseous materials.

BACKGROUND OF INVENTION

Vapors and gases are largely treated as fluids. Unlike liquids, the behavior of gases is only fluid-like at large aggregate scales. At scales near the size of air molecules, a vapor, gaseous state or air are all clouds of particles separated by vacuum. Molecules and particles of a substance that is in the gas/vapor stage are referred to herein as "gas molecules." (Similarly, materials that are in gaseous or vapor form are referred herein as "gaseous materials.") Nano scale structures, such as carbon nanotubes, are at the right size to create shapes which will interact differently with the cloud of particles than would the same shape at larger scales. Such nano-shape based devices can act as filters and/or pumps. While such static shapes apparently are incapable of doing work, the work can be done by the random motion of the particle cloud.

BRIEF SUMMARY OF INVENTION

Disclosed are a class of nano-shapes on a macro material, which, if the macro material is made on a large scale, such as sheets of material, take the random motion of air or other gaseous state materials to perform as filters and/or pumps. Because a pump will change the air pressure on each side of the surface (i.e., there is a pressure differential), such materials will also create a net force in one direction, in the same manner an airplane wing does. The shape will create this air pressure difference without any net velocity (wind direction) within the particle cloud, unlike an airplane wing, which must be in motion. This air pressure difference can provide a motive force, such as a sail, in any direction; create a lifting force, such as a wing, helicopter rotor, or lighter than air balloon. The device can move air in to a higher region of pressure, which can use the heat energy in the air, via the pressure difference, to work as a heat engine powered directly by the heat in the air. An example would be a turbine driven electric generator. The fuel source is the sun, the atmosphere acting as an energy collector, one that holds the energy for use 24 hours a day.

In general, in one embodiment, the invention features a material. The material composition includes a material having a first side and second side. The material has a plurality of nano-sized perforations between the first side and the second side. The nano-sized perforations having an inner diameter that can provide for a gas molecule to traverse through the nano-sized perforations between the first side of the material and the second side of the material. The material composition further includes at least one plurality of structure types incorporated above the plurality of the nano-sized perforations. At least one plurality of structure types is (i) a plurality of depressions incorporated above the plurality of the nano-sized perforations on the first side of the material, (ii) a plurality of rises incorporated above the plurality of the nano-sized perforations on the second side of the material, or (iii) a combination thereof. The material composition is operable to preferentially permit the traversal of the gas molecules through the nano-sized perforations from the first side to the second side.

Implementations of the invention can include one or more of the following features:

The first side of the material can have the plurality of depressions.

The first side of the material can have the plurality of depressions, and the second side of the material can have the plurality of rises.

The material composition can be operable to have a migration ratio between the first side and the second side of at least 1.0001 to 1.

The migration ratio can be at least 1.001 to 1.
The migration ratio can be at least 1.01 to 1.
The migration ratio can be at least 1.1 to 1.
The migration ratio can be at least 3 to 1.
The migration ratio can be at least 4 to 1.

The material composition can be operable to have a sustainable densities ratio between the second side and the first side of at least 1.0001 to 1.

The sustainable densities ratio can be at least 1.001 to 1.
The sustainable densities ratio can be at least 1.01 to 1.
The sustainable densities ratio can be at least 1.1 to 1.
The sustainable densities ratio can be at least 3 to 1.
The sustainable densities ratio can be at least 4 to 1.

The nano-sized perforations can be tubular shaped.
The nano-sized perforations can be funnel shaped.

The material can include nanotubes. The nanotubes can be within, above, and/or below the perforations. First ends of the nanotubes can be opened toward the first side of the material. Second ends of the nanotubes can be opened toward the second side of the material. The nanotubes can have an inner diameter that can provide for a gas molecule to traverse through the nanotubes from the first side of the material to the second side of the material.

The nanotubes can be carbon nanotubes.

The carbon nanotubes can be single-wall nanotubes, double-wall nanotubes, multi-wall nanotubes, scrolled nanotubes, coiled nanofibers, functionalized nanofibers, or combinations thereof.

The material composition can be operable as a gas molecule filter.

The material composition can be operable as a gaseous material pump.

The rises can be pyramid-shaped rises. The depressions can be pyramid-shaped depressions. The pyramid-shaped rises and pyramid-shaped depressions can be, respectively, polygonal pyramid-shaped rises and polygonal pyramid-shaped depressions.

The rises can be cone-shaped rises. The depressions can be cone-shaped depressions.

The plurality of nano-sized perforations can include a plurality of rows of nano-sized perforations.

The plurality of rows of nano-sized perforations can be staggered rows.

The plurality of nano-sized perforations can be irregularly spaced.

The material can include a substance can be a polymer, paper, carbon, silicon, metal, metal alloy, or a combination thereof.

The material can include a polymer.

The gas molecules can be in the range of the size of air molecules.

In general, in another embodiment, the invention features a method of manufacturing a material composition. The method includes forming a material having a first side and second side. The material has a plurality of nano-sized perforations between the first side and the second side. The nano-sized perforations have an inner diameter that can provide for a gas molecule to traverse through the nano-sized perforations between the first side of the material and the second side of the material. The method further includes forming at least one plurality of structure types incorporated above the plurality of nano-sized perforations. The step of forming at least one plurality of structure types includes a formation process that includes (i) forming a plurality of depressions above the plurality of the nano-sized perforations on the first side of the material, (ii) forming a plurality of rises above the plurality of the nano-sized perforations on the second side of the material, or (iii) a combination thereof. The material composition is operable to preferentially permit the traversal of the gas molecules through the nano-sized perforations from the first side to the second side.

Implementations of the invention can include one or more of the following features:

The formation process can include forming the plurality of depressions above the plurality of the nano-sized perforations on the first side of the material.

The formation process can include forming the plurality of depressions above the plurality of the nano-sized perforations on the first side of the material, and the formation process can include forming the plurality of rises above the plurality of the nano-sized perforations on the second side of the material.

The material composition can be operable to have a migration ratio between the first side and the second side of at least 1.0001 to 1.

The migration ratio can be at least 1.001 to 1.
The migration ratio can be at least 1.01 to 1.
The migration ratio can be at least 1.1 to 1.
The migration ratio can be at least 3 to 1.
The migration ratio can be at least 4 to 1.

The material composition can be operable to have a sustainable densities ratio between the second side and the first side of at least 1.0001 to 1.

The sustainable densities ratio can be at least 1.001 to 1.
The sustainable densities ratio can be at least 1.01 to 1.
Thee sustainable densities ratio can be at least 1.1 to 1.
The sustainable densities ratio can be at least 3 to 1.
The sustainable densities ratio can be at least 4 to 1.

The material can include a substance that is a polymer, paper, silicon, metal, metal alloy, or a combination thereof.

The material can include a polymer.

The step of forming the material can include forming the plurality of perforations between the first side of the material and the second side of the materials by a material formation process. This step can include depositing a photoresist material on a substrate. This step can further include exposing light through a mask to selectively weaken or strengthen a patterned portion of the material such that the material has a weaker portion and a stronger portion. This step can further include removing at least a portion of the weaker portion of the material to form the plurality of perforations from the first side of the material to the second side of the material.

The step of forming the at least one plurality of structure types can include a first structure formation process that comprises a series of successive patterning and processing steps build up the at least one plurality of structure types.

The first structure formation process can form a plurality of depressions on the first side of the material. The method can further include forming a plurality of rises on the second side of the material The series of successive patterning and processing steps can build up the plurality of rises.

The material can include nanotubes. The nanotubes can be within, above, and/or below the perforations. First ends of the nanotubes can be opened toward the first side of the material. Second ends of the nanotubes can be opened toward the second side of the material. The nanotubes can have an inner diameter that can provide for a gas molecule to traverse through the nanotubes from the first side of the material to the second side of the material.

The nanotubes can be carbon nanotubes.

The carbon nanotubes can be single-wall nanotubes, double-wall nanotubes, multi-wall nanotubes, scrolled nanotubes, coiled nanofibers, functionalized nanofibers, or combinations thereof.

The step of forming the material can include selecting a nanotube forest and embedding it in a substance.

The substance can be a polymer.

In general, in another embodiment, the invention features a method. The method includes selecting a material composition that includes a material having a first side and second side. The material has a plurality of nano-sized perforations between the first side and the second side. The material further includes at least one plurality of structure types incorporated above the plurality of the nano-sized perforations. At least one plurality of structure types are (A) a plurality of depressions incorporated above the plurality of the nano-sized perforations on the first side of the material, (B) a plurality of rises incorporated above the plurality of the nano-sized perforations on the second side of the material, or (iii) a combination thereof. The method further includes positioning the material composition by a first environment that comprises gas molecules. The first side of the material composition faces the first environment. The method further includes utilizing the material composition to preferentially permit the traversal of the gas molecules through the nano-sized perforations from the first side to the second side.

Implementations of the invention can include one or more of the following features:

The first side of the material can have the plurality of depressions.

The first side of the material can have the plurality of depressions, and the second side of the material can have the plurality of rises.

The step of utilizing the material composition to preferentially permit the traversal of the gas molecules through the nano-sized perforation can have a migration ratio between the first side and the second side of at least 1.0001 to 1.

The migration ratio can be at least 1.001 to 1.
The migration ratio can be at least 1.01 to 1.
The migration ratio can be at least 1.1 to 1.
The migration ratio can be at least 3 to 1.
The migration ratio can be at least 4 to 1.

The step of utilizing the material composition to preferentially permit the traversal of the gas molecules through the nano-sized perforation can have a sustainable densities ratio between the second side and the first side of at least 1.0001 to 1.

The sustainable densities ratio can be at least 1.001 to 1.
The sustainable densities ratio can be at least 1.01 to 1.

The sustainable densities ratio can be at least 1.1 to 1.
The sustainable densities ratio can be at least 3 to 1.
The sustainable densities ratio can be at least 4 to 1.

The step of positioning can further include positioning the material composition as a boundary between the first environment and a second environment. The second side of the material composition can face the second environment.

The step of utilizing the material composition can include the first environment being cause to be at a lower density and pressure than the second environment. The step of utilizing the material composition can include the first environment being caused to have a higher ratio of (a) gas molecule having a size too large to traverse through the nano-sized perforations from the first side to the second side to (b) gas molecules having a size that can traverse through the nano-sized perforations from the first side to the second side, as compared to the second environment.

The material composition can be used to filter gaseous materials between the first environment and the second environment based on molecular size.

The step of utilizing the material composition to preferentially permit the traversal of the gas molecules through the nano-sized perforation can have a sustainable densities ratio between the second side and the first side of at least 1.05 to 1.

The material composition can be used to pump gaseous material between the first environment and the second environment.

The step of utilizing the material composition to preferentially permit the traversal of the gas molecules through the nano-sized perforation can have a sustainable densities ratio between the second side and the first side of at least 2 to 1.

The material can include nanotubes. The nanotubes can be within, above, and/or below the perforations. First ends of the nanotubes can be opened toward the first side of the material. Second ends of the nanotubes can be opened toward the second side of the material.

The nanotubes can have an inner diameter that can provide for a gas molecule to traverse through the nanotubes from the first side of the material to the second side of the material.

The material composition can be used to create a pressure differential between the first environment and the second environment.

The material composition can be used to create a pressure differential between the first side of the material and the second material.

The method can further include selecting a second material composition. The second material composition can include a second material having a first side and second side. The second material can have a plurality of nano-sized perforations between the first side and the second side of the second material. At least one plurality of structure types can be incorporated above the plurality of the nano-sized perforations of the second material. At least one plurality of structure types can be (A) a plurality of depressions incorporated above the plurality of the nano-sized perforations on the first side of the second material, (B) a plurality of rises incorporated above the plurality of the nano-sized perforations on the second side of the second material, or (C) a combination thereof. The second material composition can further include positioning the material composition as a boundary between the second environment and a third environment. The first side of the second material composition can face the second environment. The second side of the second material composition can face the third environment. The second material composition can further include utilizing the second material composition to preferentially permit the traversal of the gas molecules through the nano-sized perforations from the first side of the second material to the second side of the second material.

The material composition and the second material composition can both be planar materials positioned parallel to one another.

The material composition can be in a first tubular form. The second material composition can be in a second tubular form. The material composition and the second material composition can be located radially, concentric to one another.

The second material composition can be located concentrically within the material composition.

In general, in another embodiment, the invention features a system. The system includes a material composition that includes a material having a first side and second side. The material has a plurality of nano-sized perforations between the first side and the second side. The nano-sized perforations have an inner diameter that can provide for a gas molecule to traverse through the nano-sized perforations between the first side of the material and the second side of the material. The material composition further includes at least one plurality of structure types incorporated above the plurality of the nano-sized perforations. At least one plurality of structure types is (A) a plurality of depressions incorporated above the plurality of the nano-sized perforations on the first side of the material, (B) a plurality of rises incorporated above the plurality of the nano-sized perforations on the second side of the material, or (C) a combination thereof. The system further includes a first environment including gas molecules. The first environment has a boundary including at least part of the material composition. The first side of the material faces the first environment. The system further includes a second environment. The second environment has a boundary including at least part of the material composition. The second side of the material faces the second environment. The material composition is operable to preferentially permit the traversal of the gas molecules through the nano-sized perforations from the first environment to the second environment.

Implementations of the invention can include one or more of the following features:

The first side of the material can have the plurality of depressions.

The first side of the material can have the plurality of depressions, and the second side of the material can have the plurality of rises.

The material composition can be operable to have a migration ratio between the first side and the second side of at least 1.0001 to 1.

The migration ratio can be at least 1.001 to 1.
The migration ratio can be at least 1.01 to 1.
The migration ratio can be at least 1.1 to 1.
The migration ratio can be at least 3 to 1.
The migration ratio can be at least 4 to 1.

The material composition can be operable to have a sustainable densities ratio between the second side and the first side of at least 1.0001 to 1.

The sustainable densities ratio can be at least 1.001 to 1.
The sustainable densities ratio can be at least 1.01 to 1.
The sustainable densities ratio can be at least 1.1 to 1.
The sustainable densities ratio can be at least 3 to 1.
The sustainable densities ratio can be at least 4 to 1.

The system can further include a second material composition. The second material composition can include a second material having a first side and second side. The second material can have a plurality of nano-sized perforations between the first side and the second side. The nano-sized perforations can have an inner diameter that can provide for a gas molecule to traverse through the nano-sized perforations between the first side of the second material and the second side of the second material. The second material composition can further include at least one plurality of structure types incorporated above the plurality of the nano-sized perforations of the second material. At least one plurality of structure types can be (A) a plurality of depressions incorporated above the plurality of the nano-sized perforations on the first side of the second material, (B) a plurality of rises incorporated above the plurality of the nano-sized perforations on the second side of the second material, or (C) a combination thereof. The system can further include a third environment. The third environment can have a boundary that includes at least part of the second material composition. The second side of the second material can face the third environment. The second environment can have a boundary that includes at least part of the second material composition. The first side of the second material can face the second environment. The second material composition can be operable to preferentially permit the traversal of the gas molecules through the nano-sized perforations from the second environment to the third environment.

The material composition and the second material composition can both be planar materials positioned parallel to one another.

The material composition can be in a first tubular form. The second material composition can be in a second tubular form. The material composition and the second material composition can be located radially, concentric to one another.

The second material composition can be located concentrically within the material composition.

BRIEF DESCRIPTION OF THE DRAWINGS

FIGS. 1-24 are each illustrations of small sections of flat sheet materials, which include nanoscale holes from one side to the other (with nanotubes going through). The nanotubes on one side extend past the material surface, surrounded by a shape that can serve both as support and as statistically reduce likelihood a random cloud of particles will pass through. On the other surface of the material, the nanotubes openings are recessed, in a shape statistically increasing the chance random motion particles will pass through.

FIGS. 1-4 are illustrations of different perspective of a material utilized in the present invention, which perspectives are, namely, bottom (FIG. 1), orthogonal side/bottom (FIG. 2), side cross section (FIG. 3), and orthogonal side/top (FIG. 4) perspectives, respectively.

FIGS. 5-8 are illustrations of different perspective of another material utilized in the present invention, which perspectives are, namely, bottom (FIG. 5), orthogonal side/bottom (FIG. 6), side cross section (FIG. 7), and orthogonal side/top (FIG. 8) perspectives, respectively.

FIGS. 9-12 are illustrations of different perspective of another material utilized in the present invention, which perspectives are, namely, bottom (FIG. 9), bottom sliced (FIG. 10), orthogonal top/side sliced cross section (FIG. 11), and side sliced cross section (FIG. 12) perspectives, respectively.

FIGS. 13-16 are illustrations of different perspective of another material utilized in the present invention, which perspectives are, namely, bottom (FIG. 13), bottom sliced (FIG. 14), orthogonal bottom/side sliced cross section (FIG. 15), and orthogonal top/side sliced cross section (FIG. 16) perspectives, respectively.

FIGS. 17-20 are illustrations of different perspective of another material utilized in the present invention, which perspectives are, namely, bottom (FIG. 17), orthogonal bottom/side sliced (FIG. 18), orthogonal top/side sliced cross section (FIG. 19), and side sliced cross section (FIG. 20) perspectives, respectively.

FIGS. 21-24 are illustrations of different perspective of another material utilized in the present invention, which perspectives are, namely, bottom (FIG. 21), orthogonal bottom/side sliced (FIG. 22), orthogonal top/side sliced cross section (FIG. 23), and side sliced cross section (FIG. 24) perspectives, respectively.

FIG. 25 shows preconditions. FIG. 26 shows early migration ratio is in the range 3 or 4 to 1. FIG. 27 shows sustainable ratios of densities near the surface are also in the range of 3 or 4 to 1.

FIG. 28 shows preconditions. FIG. 29 shows early migration ratio is in the range 3 or 4 to 1. FIG. 30 shows sustainable densities near the surface are also in the range of 3 or 4 to 1.

FIG. 38 illustrates a nanotube forest on a substrate. FIG. 39 illustrates the nanotube forest/substrate of FIG. 38 with the nanotube forest embedded in a polymer. FIG. 40 illustrates the embedded nanotube forest/substrate of FIG. 39 with shaped depressions formed on some of the embedded nanotubes. FIG. 41 illustrates the embedded nanotube forest/substrate having shaped depressions of FIG. 40 with shaped rises formed on some of the embedded nanotubes.

DETAILED DESCRIPTION

Figure 1:
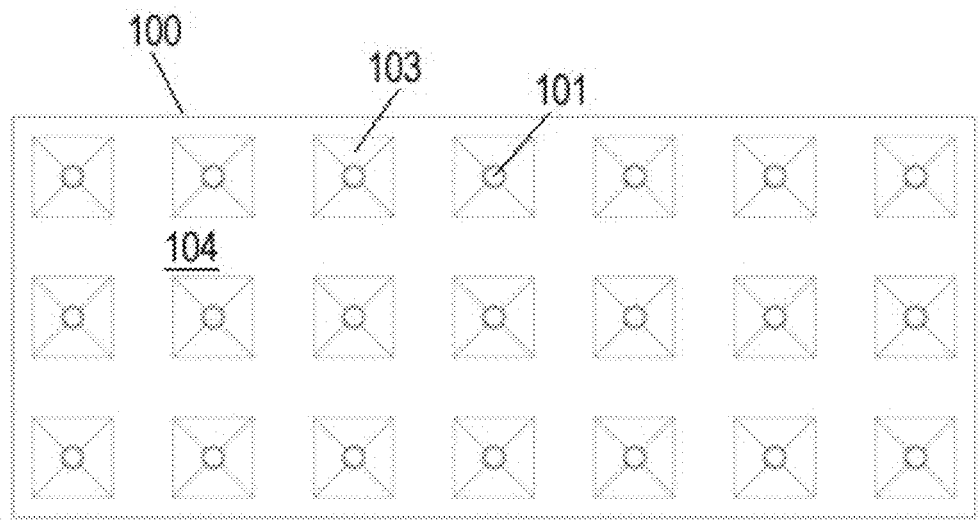
Figure 2:
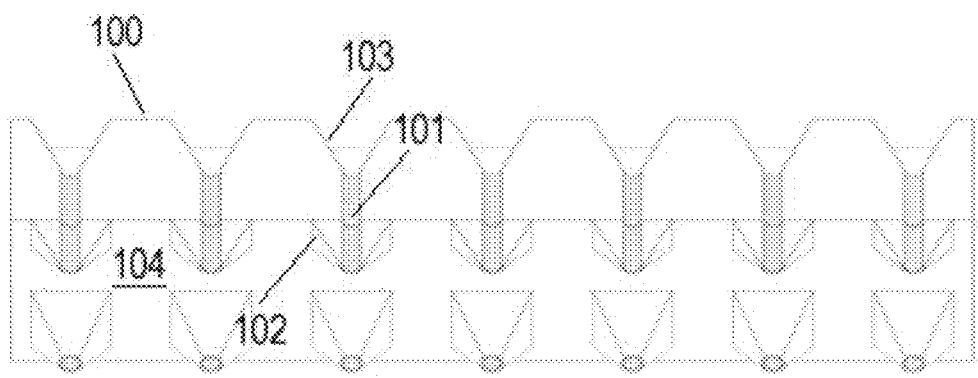
Figure 3:
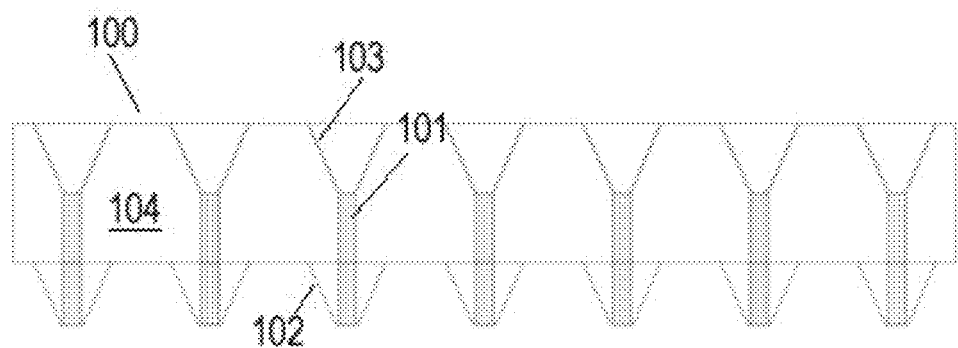
Figure 4:
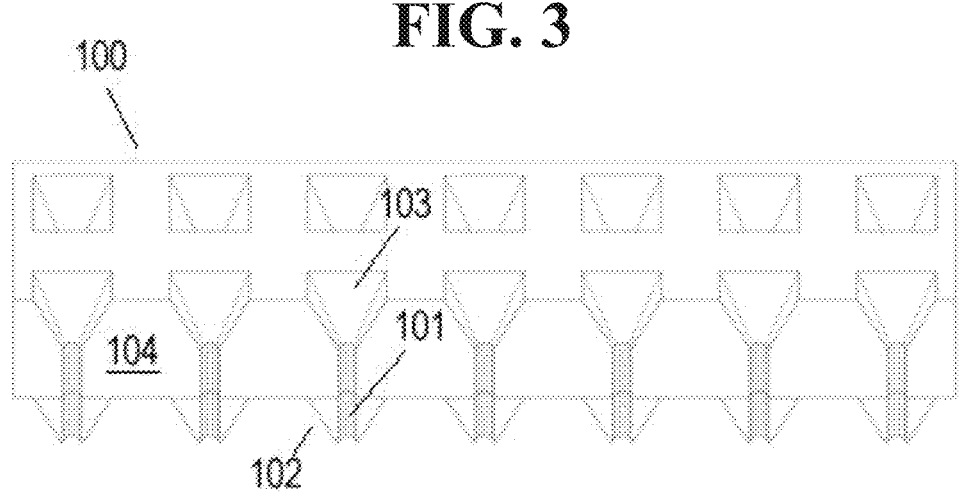
Figure 5:
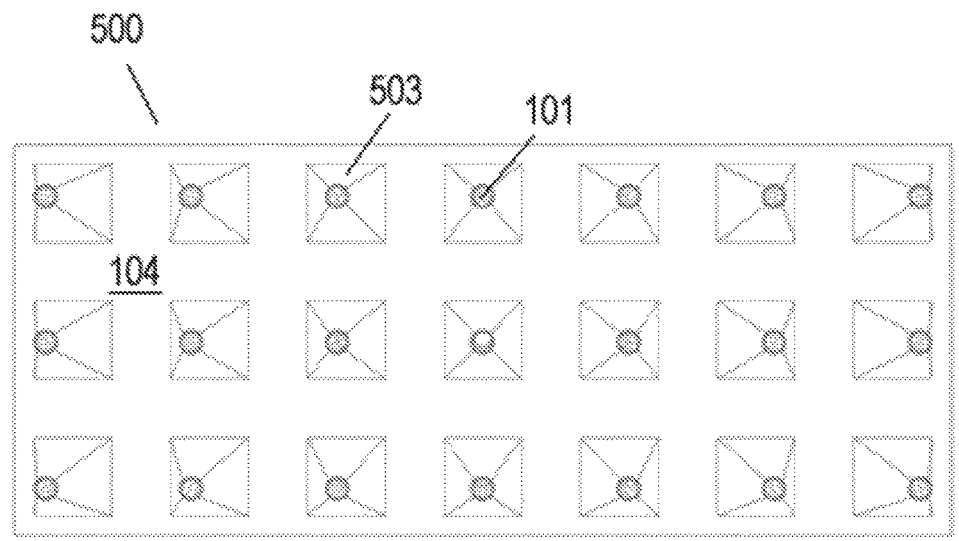
Figure 6:
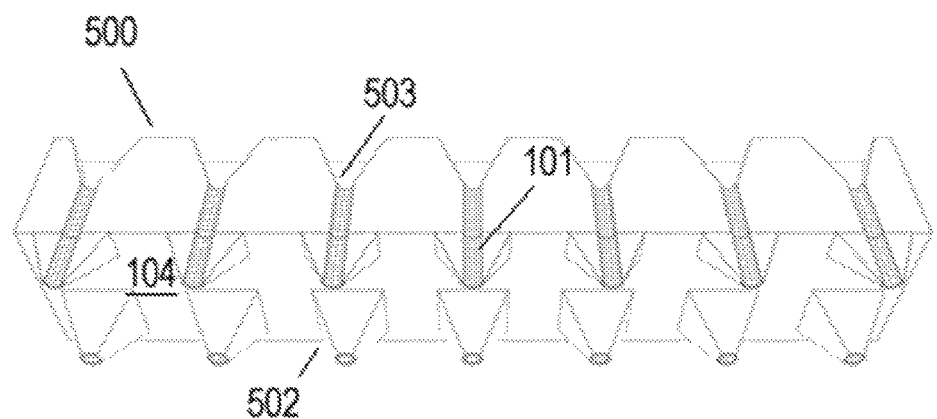
Figure 7:
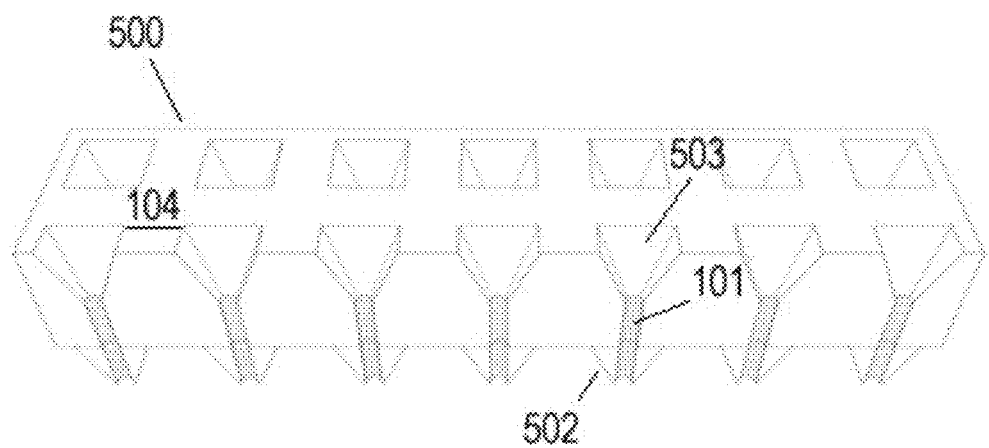
Figure 8:
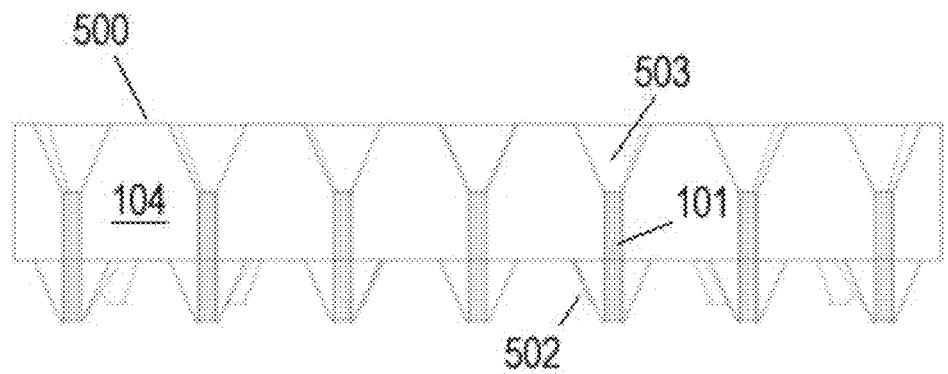
Figure 9:
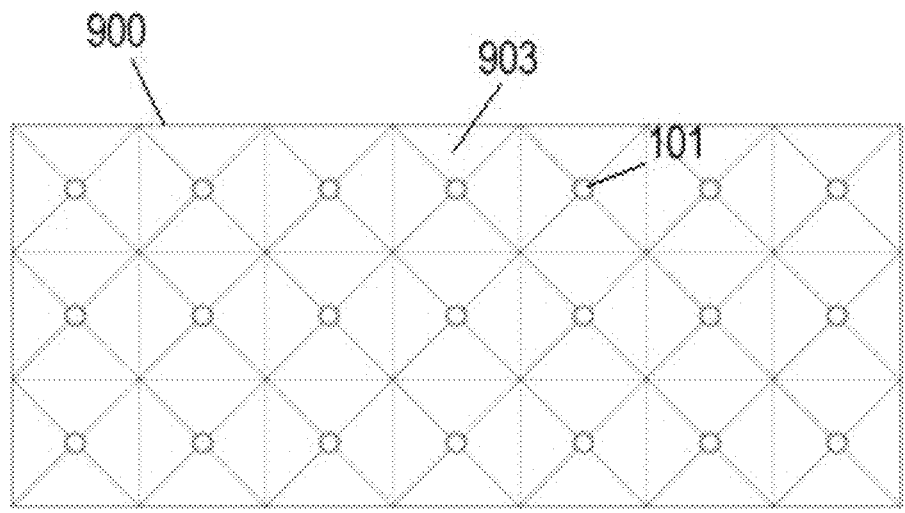
Figure 10:
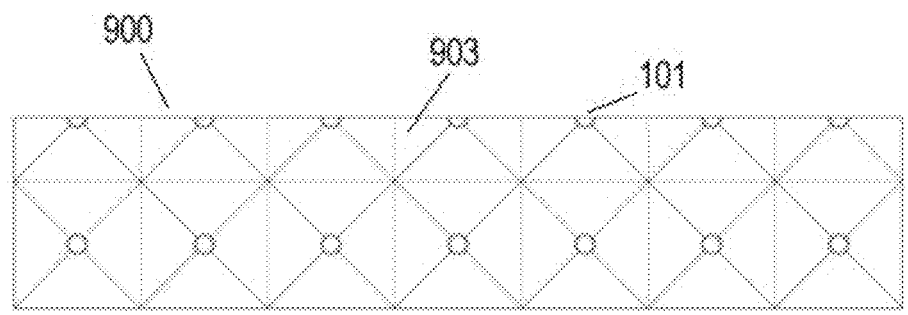
Figure 11:
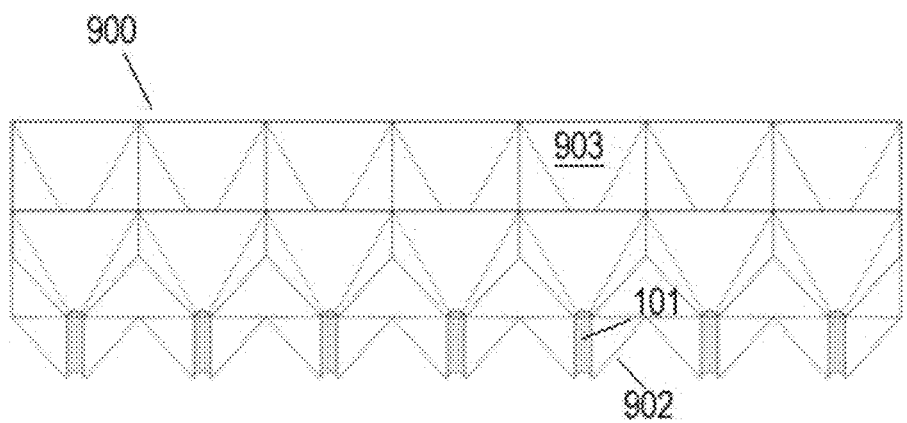
Figure 12:
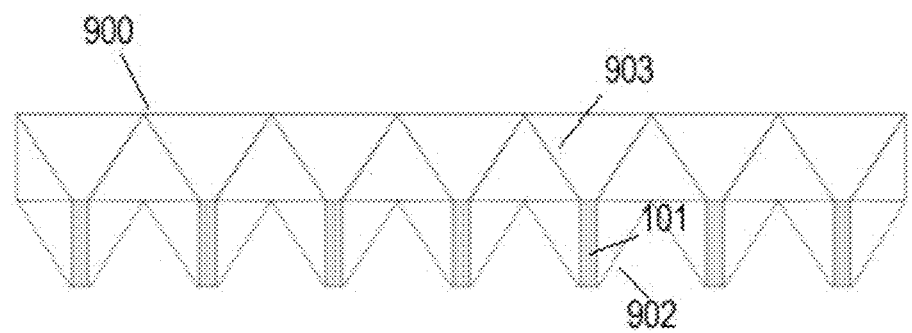
Figure 13:
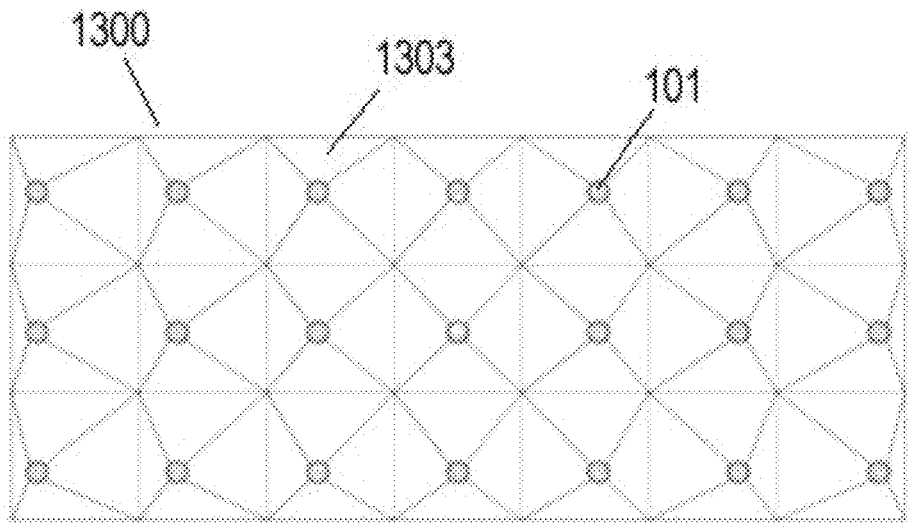
Figure 14:
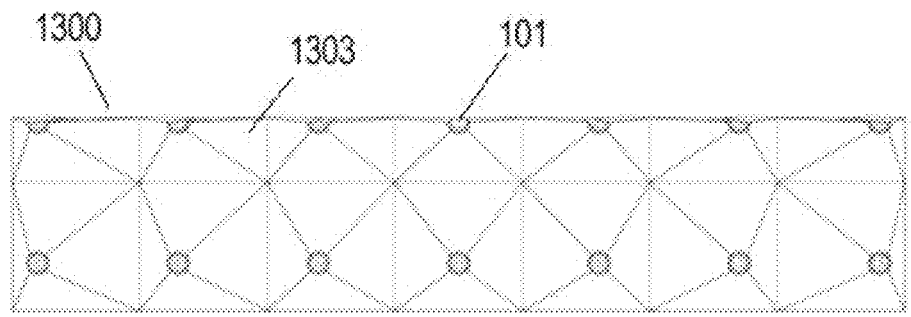
Figure 15:
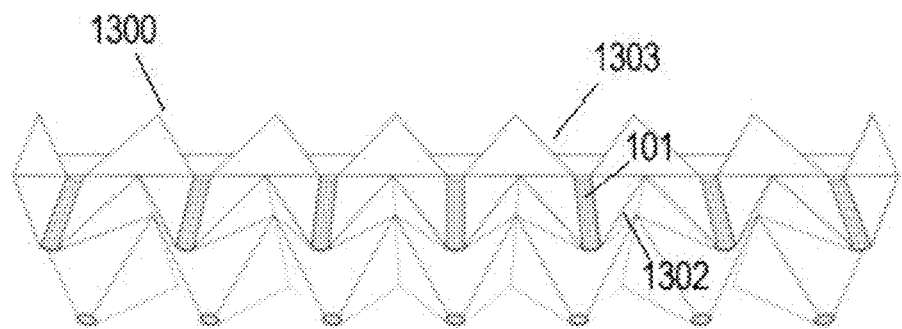
Figure 16:
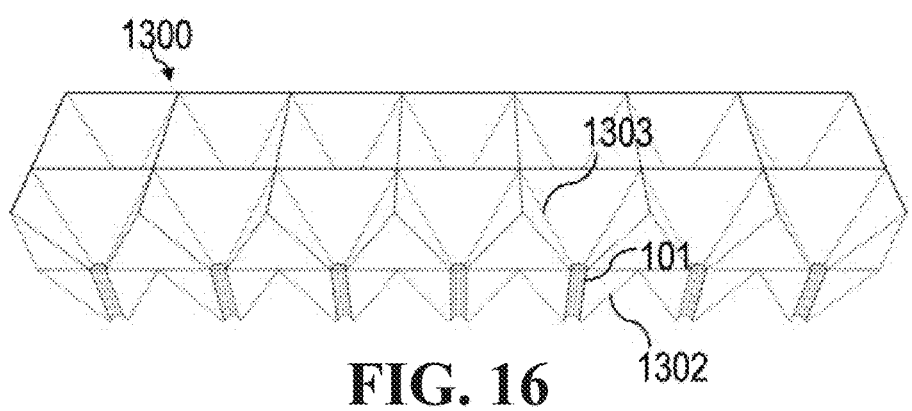
Figure 17:
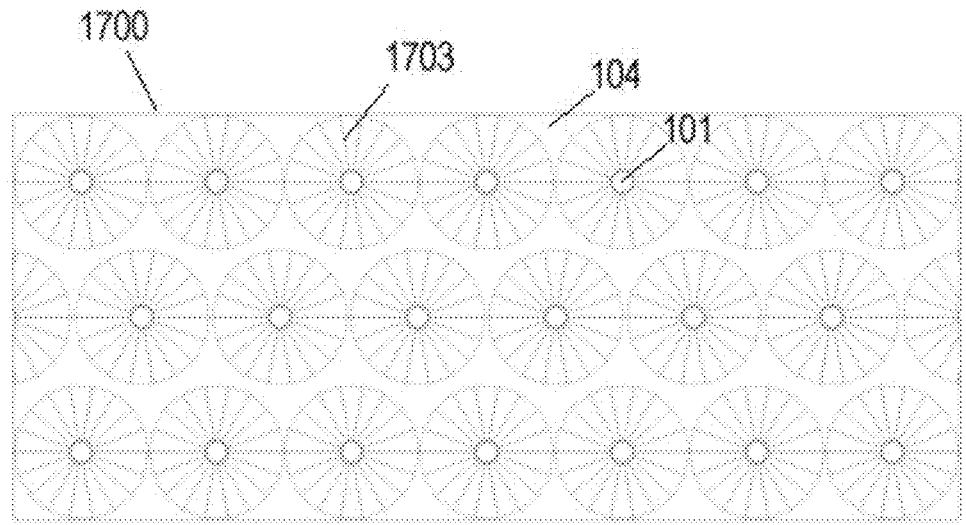
Figure 18:
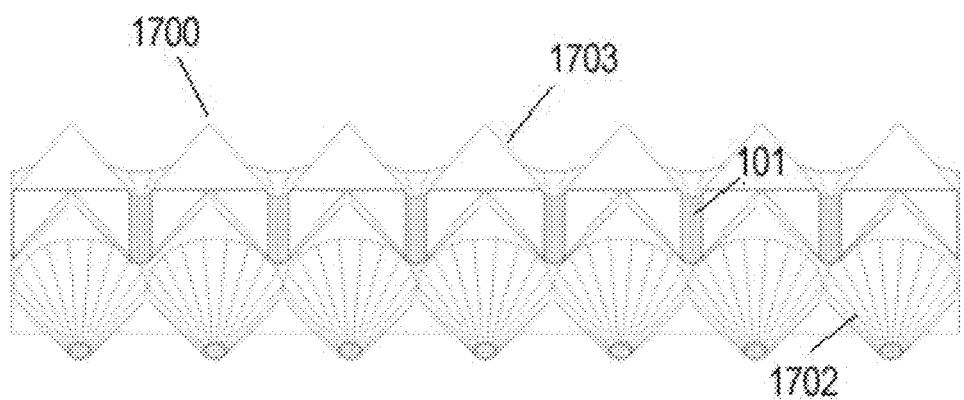
Figure 19:
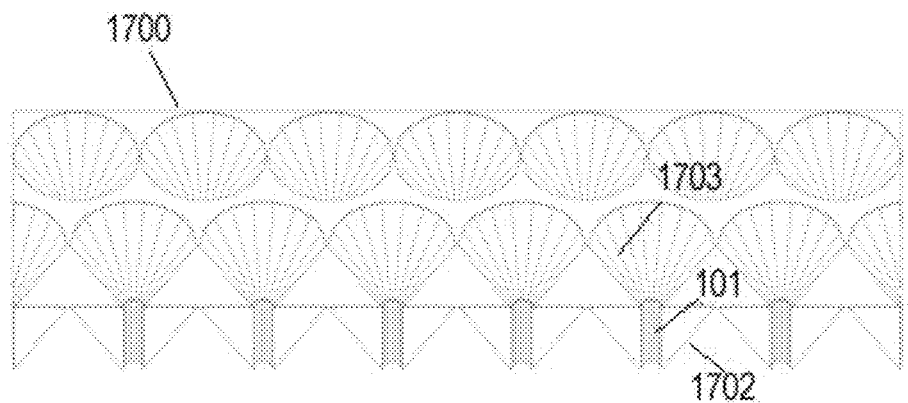
Figure 20:
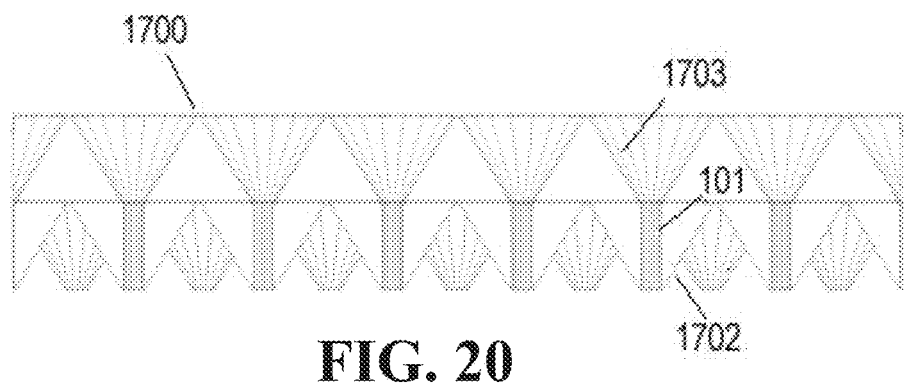
Figure 21:
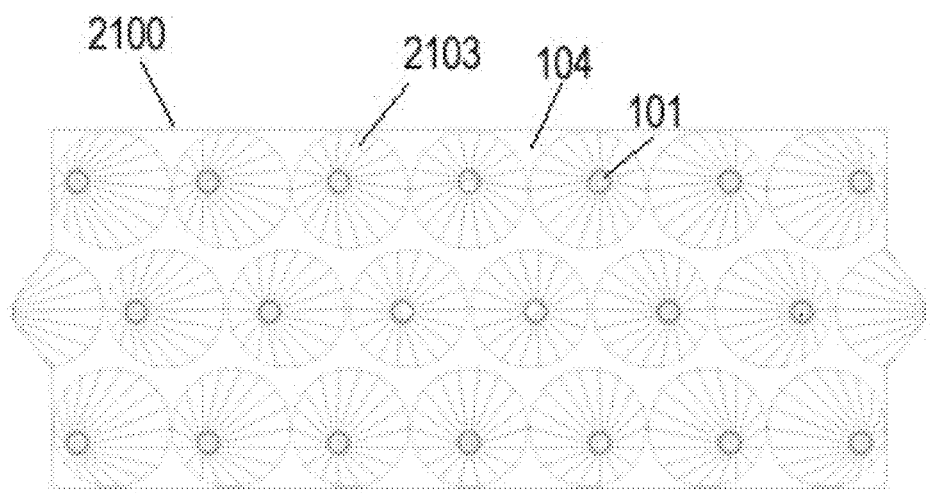
Figure 22:
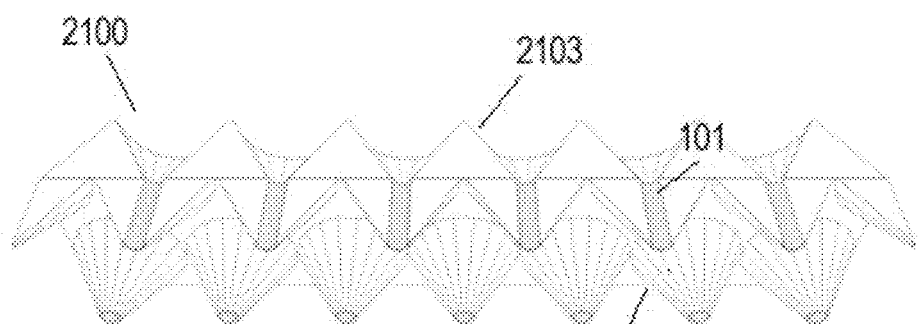
Figure 23:
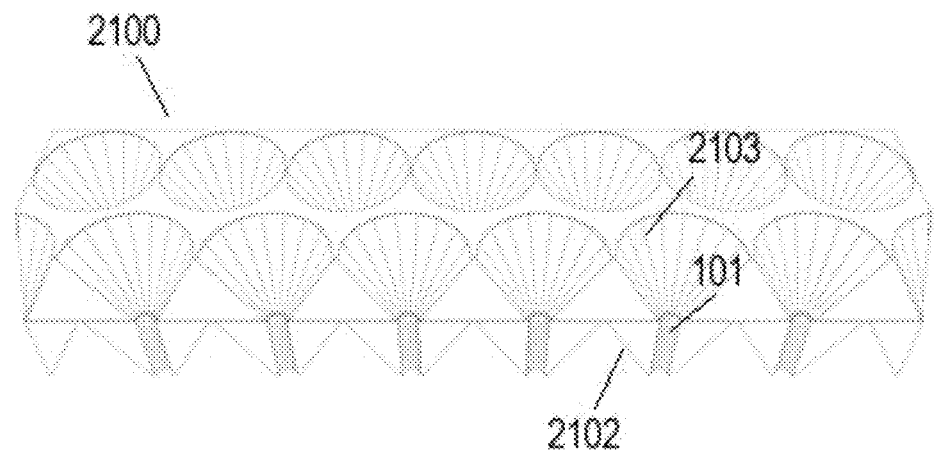
Figure 24:
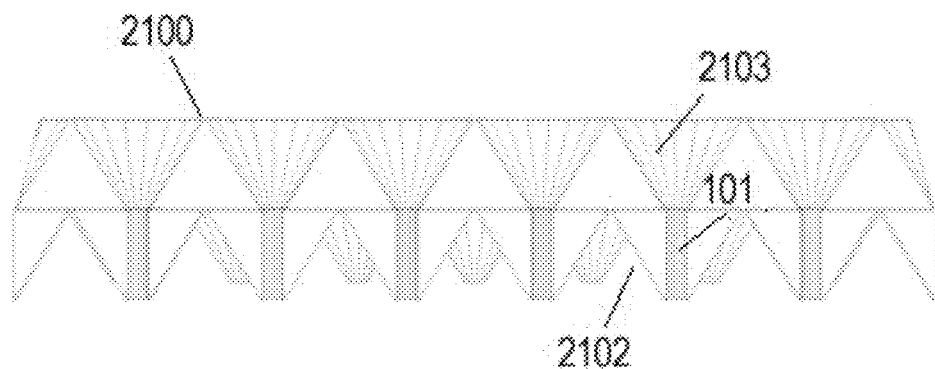

The device disclosed is a sheet of material or planer material with nanotube (or other similar sized) perforations passing completely through material. The perforations are on the nano-scale and can be in tubular shape or any other shape.

Material Compositions

The nano-surface of the low pressure sheet is shaped to increase likelihood molecules will pass into nanotubes, the nano surface of the high pressure side of the sheet is shaped to reduce the likelihood molecules will enter the nanotubes from that side of the sheet.

Depending on the relative size of molecules in the gaseous state on each side of the nano-filter-pump sheet, molecules of different sizes can have different probability of passing through. In the limiting case, molecules larger than the nanotubes openings will be unable to pass through. Smaller molecules will pass through easily. This effect can be used as a passive gas molecule sorter or filter.

The nano-shape of the surface of the filter sheet will allow some migration of small molecules in the reverse direction, but the migration will continue until equilibrium is reached, which the density of the transferable molecules on the high pressure side times the probability of random nanotubes transfer is equal to the density of the transferable molecules on the low pressure side of the sheet times the probability of transfer. For example, if the probability of random transfer from high pressure one side is 1%, and probability of transfer from the low pressure side is 20%, equilibrium is reached when the density of the high pressure side is 20 times the density of the low pressure side.

The shape can also be used to create motive force.

Even a small probability difference, 1% vs. 1.1% acting in atmosphere will create a large force, given a large area. The densities will reach equilibrium when the density on one side is 1.1 times the density on the other. At 1 atmosphere of pressure, that means 10% of 15 pounds per square inch (PSI) or 1.5 PSI net force. For this case, a 10" by 10", 100 square inch area of nano-filter-pump material would produce 150 pounds of force, enough to lift a small person.

Referring to the figures, FIGS. 1-4 illustrate different perspectives of material 100, which perspectives are, namely, bottom, orthogonal side/bottom, side cross section, and orthogonal side/top perspectives, respectively. FIGS. 1-4 are two dimensional representations of sparsely spaced tubes 101, with pyramid shaped rises 102 on one side and depressions 103 on the other, positioned on substrate 104.

FIGS. 5-8 illustrate different perspectives of material 500, which perspectives are, namely, bottom, orthogonal side/bottom, side cross section, and orthogonal side/top perspectives, respectively. FIGS. 5-8 are perspective views of the sparsely spaced tube 101 sections from FIG. 1-4, with different pyramid shaped rises 502 on one side and depressions 503 on the other, positioned on substrate 104.

FIGS. 9-12 illustrate different perspectives of material 900, which perspectives are, namely, bottom, bottom sliced, orthogonal top/side sliced cross section, and side sliced cross section perspectives, respectively. FIGS. 9-12 are two dimensional representations of tightly spaced tubes 101, with pyramid shaped rises 902 on one side and depressions 903 on the other, positioned on substrate 104.

FIGS. 13-16 illustrate different perspectives of material 1300, which perspectives are, namely, bottom, bottom sliced, orthogonal bottom/side sliced cross section, and orthogonal top/side sliced cross section perspectives, respectively. FIGS. 13-16 are perspective views of the tightly spaced tube 101 sections from FIGS. 9-12, with pyramid shaped rises 1302 on one side and depressions 1303 on the other, positioned on substrate 104.

FIGS. 17-20 illustrate different perspectives of material 1700, which perspectives are, namely, bottom, orthogonal bottom/side sliced, orthogonal top/side sliced cross section, and side sliced cross section perspectives, respectively. FIGS. 17-20 are two dimensional representations of tightly spaced tubes 101, with cone shaped rises 1702 on one side and depressions 1703 on the other, positioned on substrate 104. Additionally, the spacing between rows is staggered, for compact spacing.

FIGS. 21-24 illustrate different perspective of material 2100, which perspectives are, namely, bottom, orthogonal bottom/side sliced, orthogonal top/side sliced cross section, and side sliced cross section perspectives, respectively. FIGS. 21-24 are perspective views of the tightly spaced tube 101 sections from FIGS. 17-20, with cone shaped rises 2102 on one side and depressions 2103 on the other, positioned on substrate 104.

Figure 25:
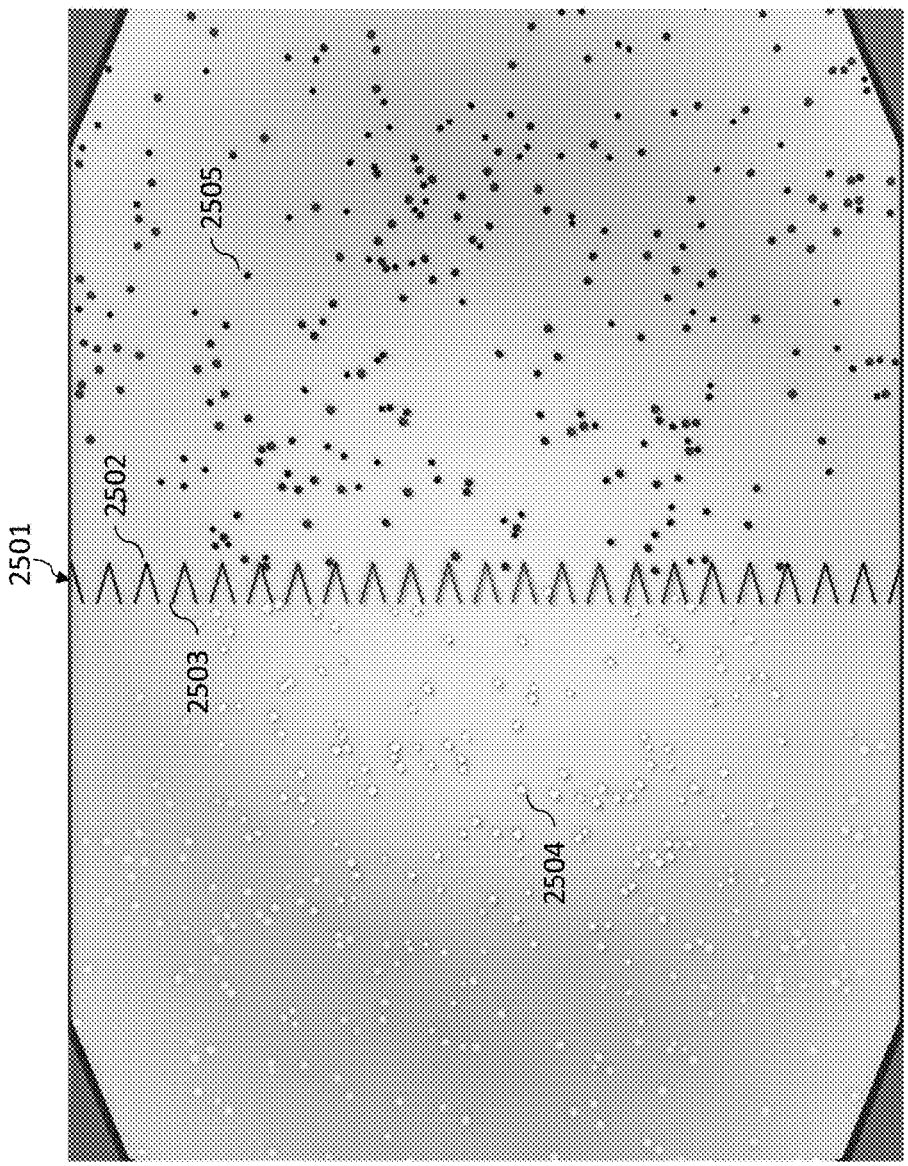
FIGS. 25-27 are a series of snapshots of a simulation of two dimensional random motion, with a selective shaped divider made up of acute angled shapes and small openings relative to molecule spacing.
Figure 26:
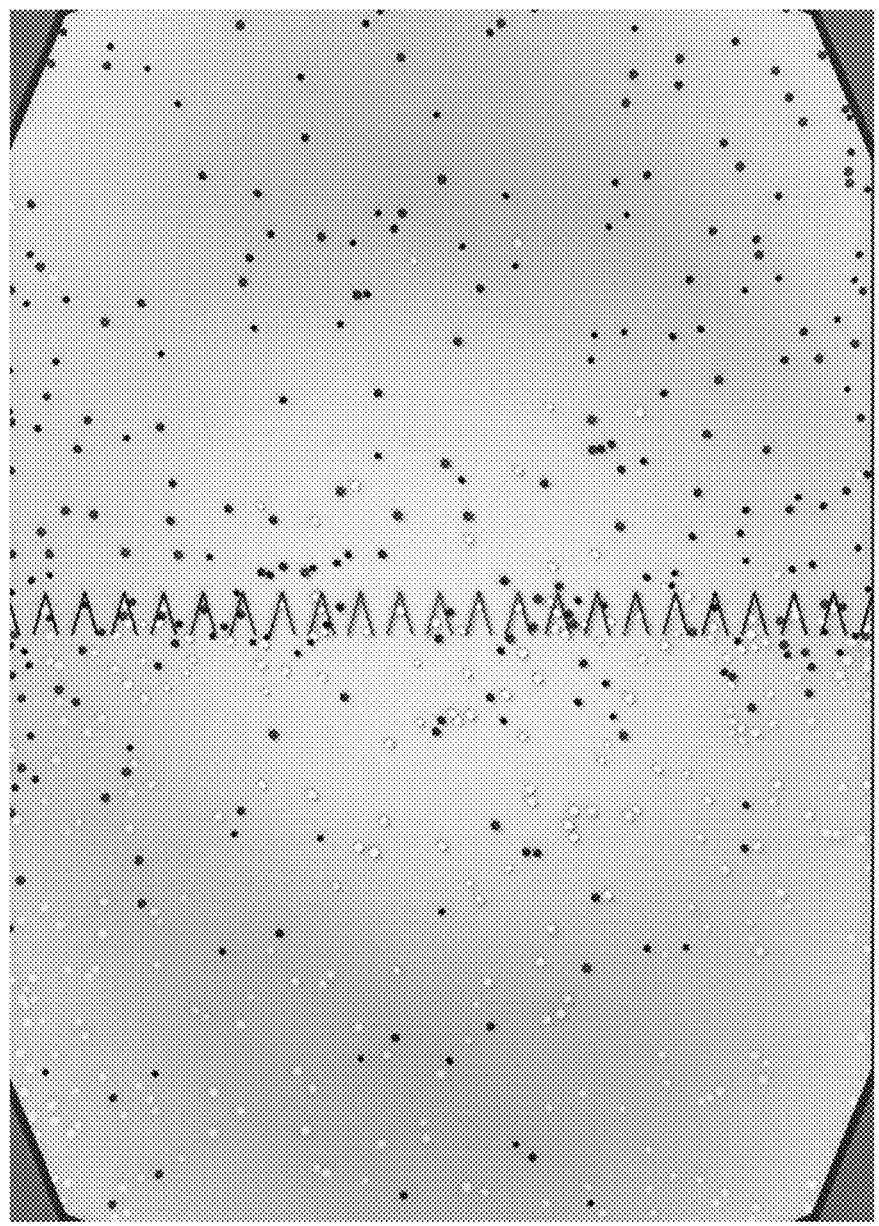
Figure 27:
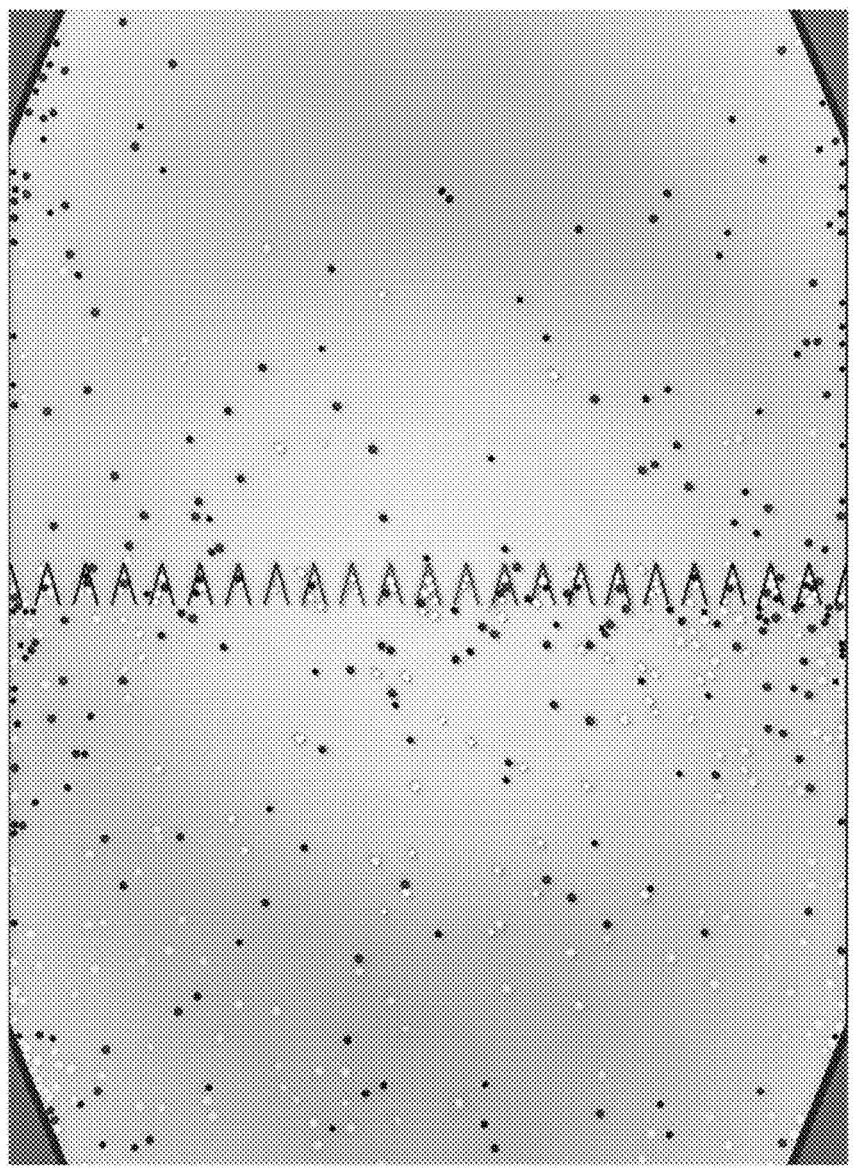

FIGS. 25-27 are a series of snapshots of a simulation of two dimensional random motion, with a selective shaped divider 2501 made up of acute angled shapes 2502 and small openings 2503 relative to molecule spacing. FIG. 25 shows preconditions with light molecules 2504 on the left side of divider 2501 and dark molecules 2505 on the right side of divider 2501. FIG. 26 shows early migration ratio of the molecules of (a) molecule migration from right to the left of divider 2501 to (b) molecule migration from left to the right of divider 2501 to be in the range 3 or 4 to 1. The phrase "migration ratio" as used herein is the ratio of (a) migration through a divider in a first direction (i.e., from a first side of the material to a second side of the material as compared to (b) migration through the divider in the opposite direction (i.e., from the second side of the material to the first side of the material). FIG. 27 shows sustainable ratio of densities near the surface between (a) the left side of divider 2501 and (b) the right side of divider 2501 are also in the range of 3 or 4 to 1. The phrase "densities ratio" as used herein is the ratio of (a) density near the surface on a first side of the divider as compared to (b) density near the surface on the opposite side of the divider. A divider "preferentially" permits the traversal of the gas molecules through the nano-sized perforations from the first side of the material to the second side of the material when the migration ratio is greater than 1 to 1.

Figure 28:
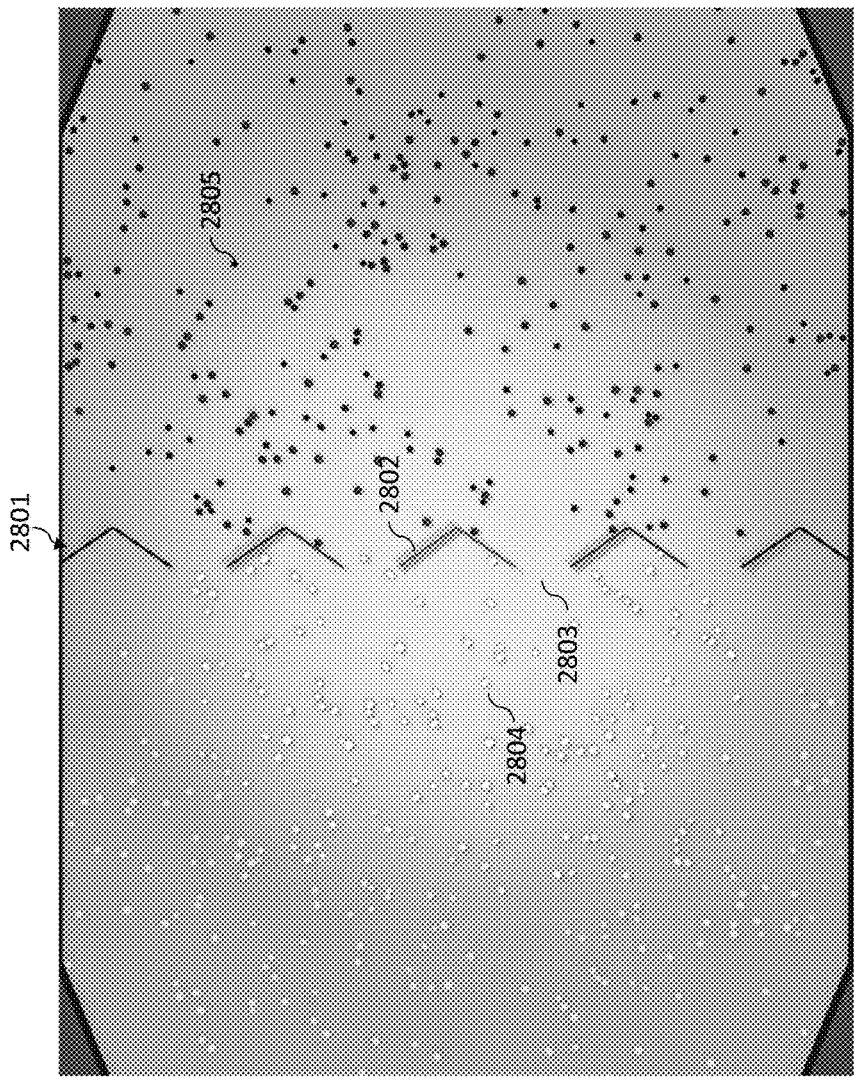
FIGS. 28-30 are a series of snapshots of a simulation of two dimensional random motion, with a selective shaped divider made up of obtuse angled shapes and large openings relative to molecule spacing.
Figure 29:
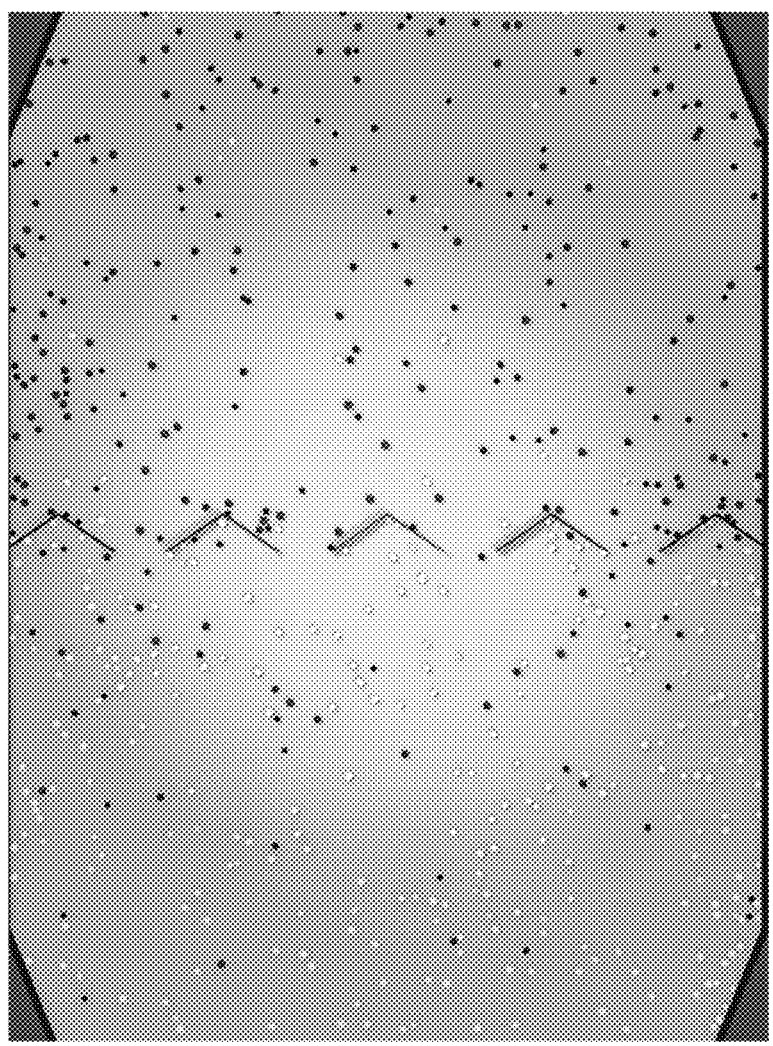
Figure 30:
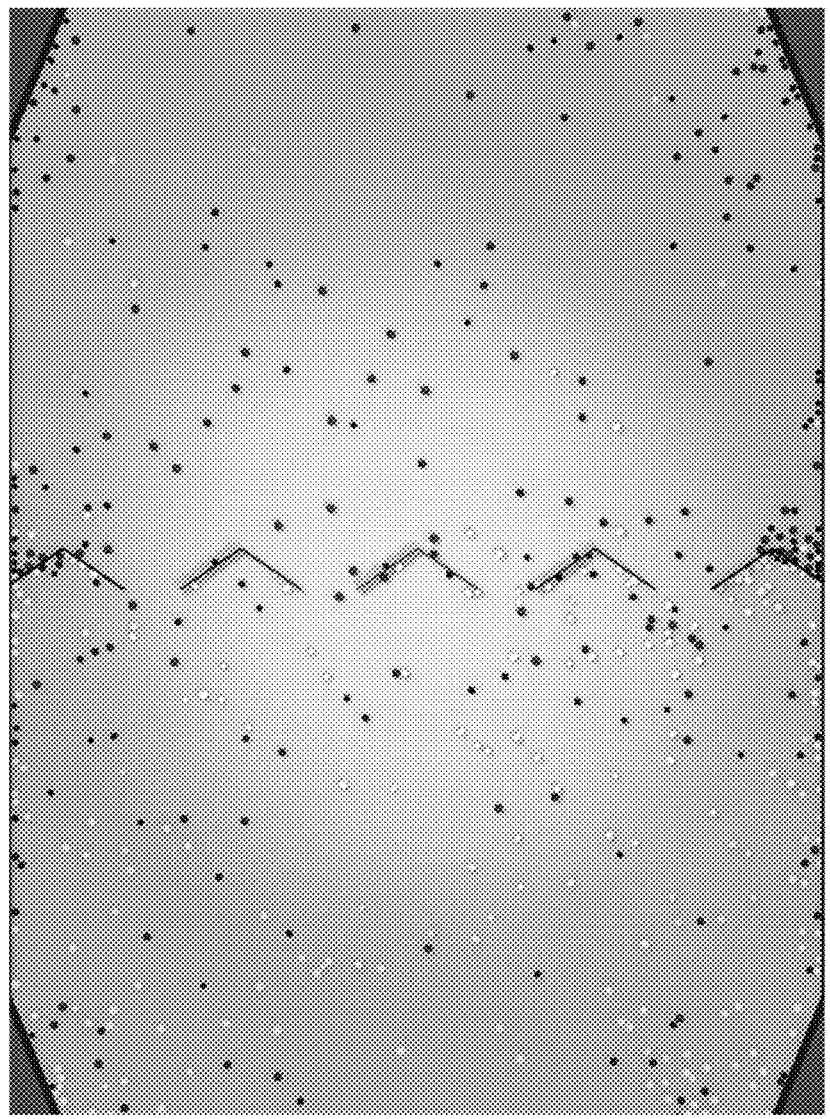

FIGS. 28-30 are a series of snapshots of a simulation of two dimensional random motion, with a selective shaped divider 2801 made up of obtuse angled shapes 2802 and large openings 2803 relative to molecule spacing. FIG. 28 shows preconditions with light molecules 2804 on the left side of divider 2801 and dark molecules 2805 on the right side of divider 2801. FIG. 29 shows early migration ratio (right-left as compared to left-right) is in the range 3 or 4 to 1. FIG. 30 shows sustainable densities near the surface are also in the range of 3 or 4 to 1. Very similar results were also received with obtuse angles and narrower openings.

Figure 31:
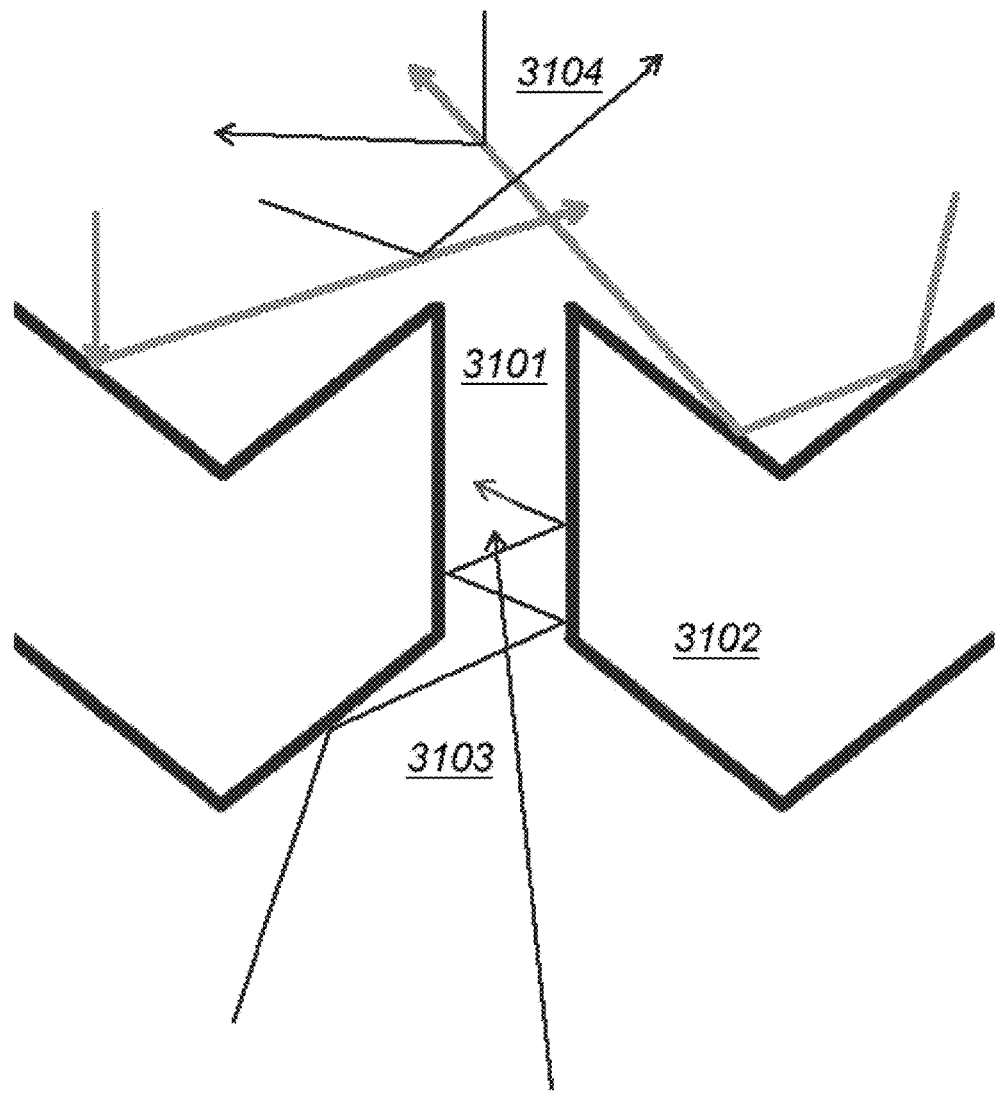
FIG. 31 is an illustration showing statistical mechanisms of selective transfer through the nanotubes in a divider.
Figure 32:
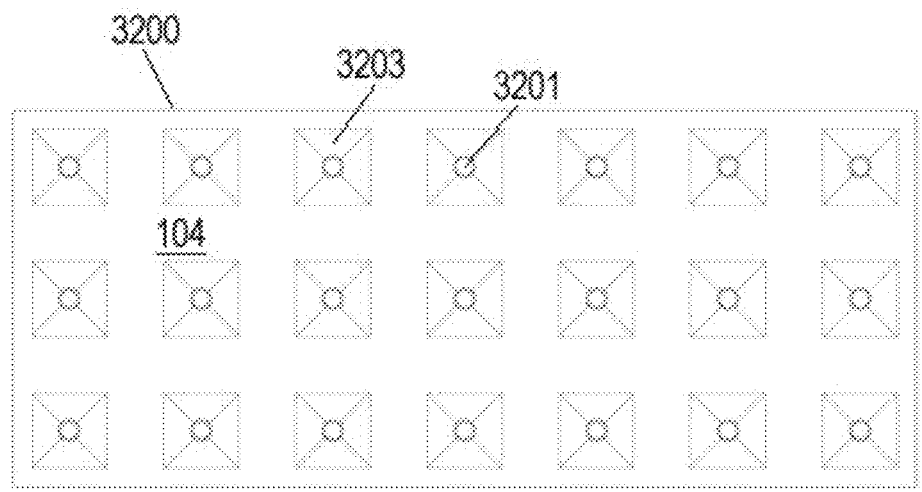
FIGS. 32-35 are illustrations of different perspective of another material utilized in the present invention that does not utilize nanotubes, which perspectives are, namely, bottom (FIG. 32), orthogonal side/bottom (FIG. 33), side cross section (FIG. 34), and orthogonal side/top (FIG. 35) perspectives, respectively.
Figure 33:
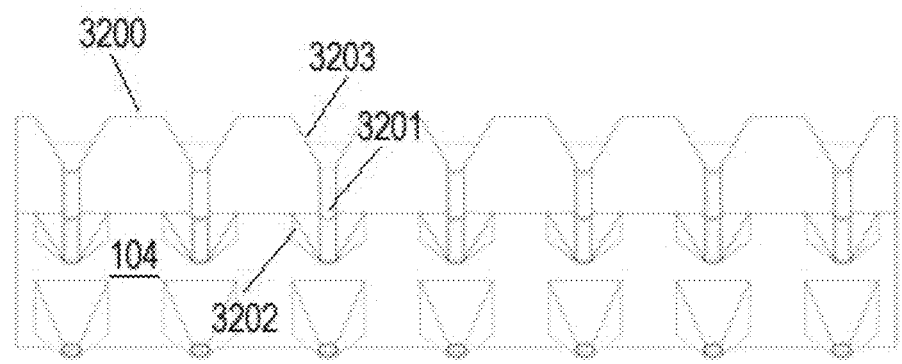
Figure 34:
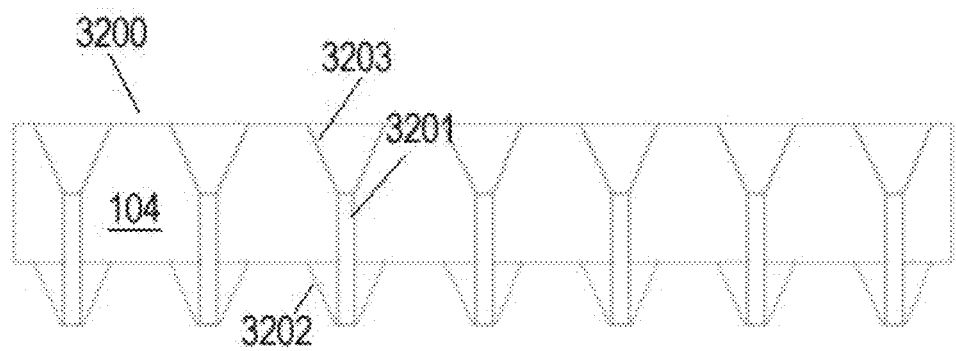
Figure 35:
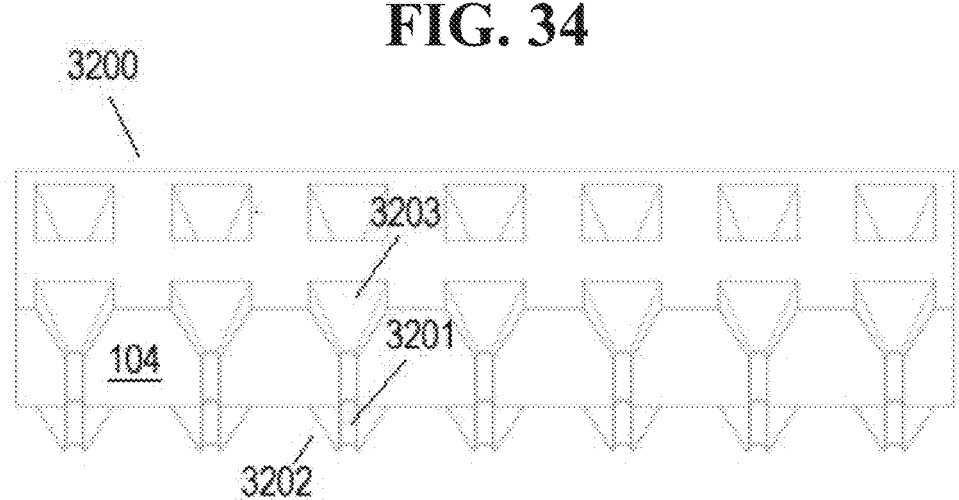

FIG. 31 is an illustration showing statistical mechanisms of selective transfer through the nanotubes. The illustration shows a nanotube passage 3101 having through solid portion 3102 of material, with a first region 3103 on a first side of the material and a second region 3104 on the other side of the material. Region 3103 is on the first side of the sheet, which has structures that increase chances of molecules entering and passing through the nanotube passages 3101 (which is in the upward direction in FIG. 31). Some collisions will be deflected into tube. The second region 3104 on the opposite side of the material has structures that decrease chances of molecules entering and passing through the nanotube passages 3101 (which is in the downward direction in FIG. 31). Some collisions from solid sheet will send molecules on trajectories which will collide with molecules on a heading to enter tube, deflecting them. No collisions with solid sheet can directly enter tube.

In alternative embodiments of the present invention, the passages can be made having similar sizes but without nanotubes interposed within. FIGS. 32-35 illustrate different perspectives of material 3200 utilized in the present invention that does not utilize nanotubes (such nanotubes 101 shown in FIGS. 1-24), which perspectives are, namely, bottom, orthogonal side/bottom, side cross section, and orthogonal side/top perspectives, respectively. FIGS. 32-35 are the same as in FIGS. 1-4.

FIG. 31 shows multiple ways probability of transfer can be affected.

(1) The size of the nanotubes openings (or openings without nanotubes) on either side of sheet can be manipulated by making the openings into a funnel shape instead of a cylinder. (This can be done without nanotubes, or by using nanoscrolls). So the probability of transfer is relative to the size of each opening. 2:1 funnel shape creates approximately double probability of transfer in the direction of the funnel. See nanotube passage 3101 of FIG. 31, which shows a cylindrical passage. This passage can be instead made funnel shaped.

(2) The material may be modified on one side to create lower pressure by forming a funnel shaped entrance to the nanotubes (including for cylindrical shaped nanotubes or openings without nanotubes). Although all molecules striking the wider funnel of the material will not pass through, some percentage of them will be able to bounce singly or multiple times directly into the openings. If the inverse shape is on the other side of the material, no molecules colliding with the material on the opposite side can traverse (bounce) directly into the openings opposite side. See first region 3103 of FIG. 31.

(3) The shapes on the other side of the material can be modified so as to create higher pressure by a convex shape between the openings (including for cylindrical shaped nanotubes or openings without nanotubes). The random collisions with the shape will send some molecules over the openings and away from the material, to collide with and deny entry to molecules which would otherwise enter the openings. See second region 3104 of FIG. 31. This is similar to the effect an airplane wing uses, but on a different scale. The leading edge of a wing creates an air wave front that will knock some air molecules up and away from the wing, as the wing passes under. This reduces the number of molecules hitting the upper surface of the wing, creating lift by reducing force on the wing's top.

Figure 36:
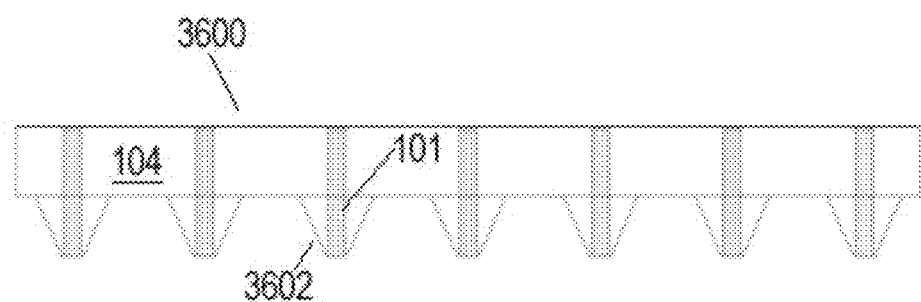
FIG. 36 is an illustration of a side cross section perspective of another material utilized in the present application, which material is similar to the material of FIGS. 1-4, except that it does not have the shaped depressions shown in FIGS. 1-4.
Figure 37:
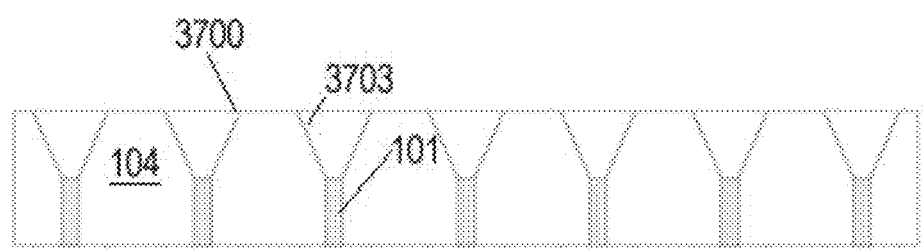
FIG. 37 is an illustration of a side cross section perspective of another material utilized in the present application, which material is similar to the material of FIGS. 1-4, except that it does not have the shaped rises shown in FIGS. 1-4.

In further embodiments of the present invention, the material can have one side with shaped rises (such as the rises 102, 502, 902, 1302, 1702, and 2102 shown in the figure) on one side without the corresponding shaped depressions (such as depressions 103, 503, 903, 1303, 1703, and 2103 shown in the figures) on the other, positioned on substrate 104. An example of this is shown in FIG. 36 reflecting material 3600 having shaped rises 3602 positioned on one side without any depressions on the other side. Likewise, the material can have one side with shaped depressions (such as depressions 103, 503, 903, 1303, 1703, and 2103 shown in the figures) on one side without the corresponding shaped rises (such as the rises 102, 502, 902, 1302, 1702, and 2102 shown in the figure) on the other, positioned on substrate 104. An example of this is shown in FIG. 37 reflecting material 3700 having shaped rises 3703 positioned on one side without any rises on the other side.

The material of the present invention and the methods of using them are can be dependent on being able to create repeating structures near the size of nitrogen ($N_2$), oxygen ($O_2$), carbon dioxide ($CO_2$) and water vapor ($H_2O$). These molecules range from 200 pico-meters to 400 pico-meters, or 0.2 nanometers to 0.4 nano-meters.

Spacing of air molecules in atmosphere is likely to be an important design measurement as well. Nitrogen is the highest percentage component of air. Liquid nitrogen is about 600 times denser than gaseous nitrogen ($N_2$) at standard temperature and pressure (STP). Taking the cube root, spacing of air molecules in every direction is between 8 and 10 molecule sizes. So molecule spacing is between 1600 pico-meters or 1.6 nano-meters, and 4000 pico-meters or 4 nano-meters.

Carbon nanotubes are reported from very small, diameter 2 nanometers, to several orders of magnitude larger. Since some carbon nanotubes are multi-wall, it is the inner most wall of these nanotubes that provides the passage. 2 nanometers is in the ideal range for this device. If possible, a funnel shaped opening from 2 nanometers down to ½ or ¼ of a nanometer would be ideal. In other embodiments, openings between 2 to 5 nanometers can be utilized, and more preferably between 2 to 3 nanometers. Control of the openings can also be performed, such as to create funnels using openings without nanotubes.

A simple opening of constant diameter can work with the present invention, particularly if the opposite surfaces of the material are made to increase and decrease, respectively, the probability of molecules transferring through the openings (with or without the nanotubes).

Strength of the material should minimally be able to handle double the atmospheric pressure, the limit of its own effect, plus significantly more if it is subject to additional forces, especially explosive forces. 30 pounds supported by 1 square inch would break most thin material sheets made of polymers (such as a plastic, nylon, etc.), paper, silicon, metals, metal alloys, and combinations thereof. The material may need to be reinforced with fibers or a net of strong materials, silk, steel, nylon as examples. Rip stop nylon can be utilized to prevent sheeting holes from propagating to rip entire sheet and catastrophic failure. If properly engineered, repair can consist of plugging punctures.

Process to Manufacture Material Compositions

Various processes to make the above-described nano filtering and/or pump materials can be performed, such as the following:

A material can be formed from a polymer of a light sensitive photoresist material known in the art (which typically is a polymer). This is done by spinning, spraying, or otherwise depositing a photoresist material on a substrate. Once deposited, the film is exposed to light through a mask, which depending upon the polymer selected can either weaken (usually by degrading or uncrosslinking) or strengthen (usually by crosslinking) the film in that location.

Afterwards, the film is exposed to a developer that can dissolve or chemically etch weakened or crosslinked areas of the polymer. The development step leaves the mask pattern (or its negative, depending on whether positive or negative photoresist is used) transferred to the film. The thin film will then form a protective, resistant, or sacrificial layer for a large number of other techniques including: etching (chemical, plasma, or other), ion implantation or other chemical manipulation, deposition (metals, oxides, etc.) and other techniques.

For example, an anisotropic etch can be performed that creates substantially vertical inner walls. Thus, if the mask is made such that the weakened area of the thin film is the patterned nanosize holes, an etching step can be used to create the tubular (or funnel) sized opening discussed above. Such an etching step would etch though the entire material (from the masked side to the other side of the material). For instance, an anisotropic etching process can be used to create substantially vertical etches or a control etching process can be used for etching at a particular wall angle (i.e., slope).

If nanotubes are to be included within the tubular openings, these can be applied as this point in the process. For example, the carbon nanotubes can be applied by the submersion of the material in a solution of carbon nanotubes. A washing step can then be used to remove any excess carbon nanotubes.

As for the rises and depressions, multiple successive patterning and processing steps can then build up these structures. Because of the extension use of silicon in the integrated circuitry industry, a great deal of technology has been developed (and can be utilized) for this type of patterning and processing steps. These techniques have been extended to a variety of other materials from semiconductors, to metals and oxides, and to polymers. See, e.g., U.S. Pat. No. 6,649,327, issued Nov. 18, 2003 to Kim et al.; U.S. Pat. No. 7,341,955, issued Mar. 11, 2008 to Nam; U.S. Pat. No. 9,431,219, issued Aug. 30, 2016 to Cushen et al.

Alternatively, methods are known for growing both single-wall and multi-wall nanotubes as forests of parallel aligned fibers on a solid substrate and for utilizing these carbon nanotube forests. S. Fan et al., Science 283, 512 (1999); J. G. Wen et. al., J. Mater. Res. 16(11), 3246 (2001); K. Jiang et al., Nature 419, 801 (2002)). A nanotube forest is so called because the nanotubes grow from a substrate like approximately parallel trees and have close to the same height. Such nanotubes can be single-wall nanotubes, double-wall nanotubes, multi-wall nanotubes, scrolled nanotubes, coiled nanofibers, functionalized nanofibers, and combinations thereof.

The nanotube forest can be embedded in a polymer solution to form a polymer material with substantially parallel nanotubes interspersed therein. Steps can be taken to that can prevent the polymer from being incorporated within the inner diameter of the nanotubes, including selecting polymers too large to be so incorporated or by other physical hindrances. Alternatively, the polymer solution is one that can be strengthened, and the application process of such strengthening can be prevented within the interior of the carbon nanotubes (such that any polymer within the nanotubes can be removed by a washing step of by other known techniques, including as described above).

Once the polymer/nanotube material is formed, the original substrate (upon which the carbon nanotube forest was grown) can be completely removed. This polymer/nanotube materials can then have the rises and depressions formed upon, such as utilizing the processes described above, i.e., multiple successive patterning and processing steps can then build up these structures.

Figure 38:
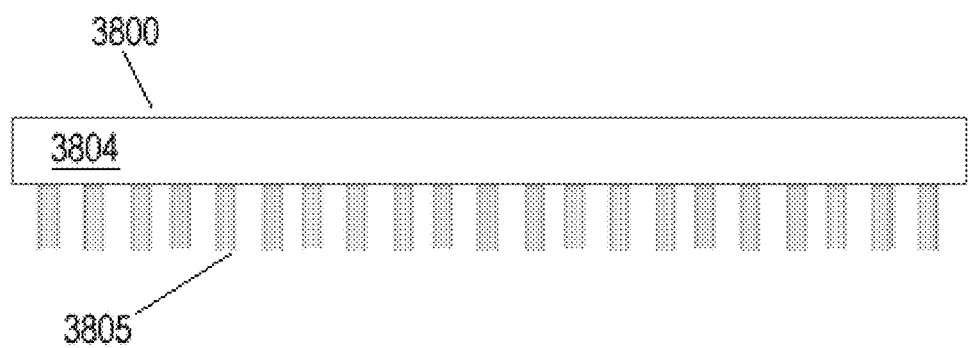
FIGS. 38-41 illustrate various steps during the process in which a nanotube forest is used to make a material utilized in the present invention.
Figure 39:
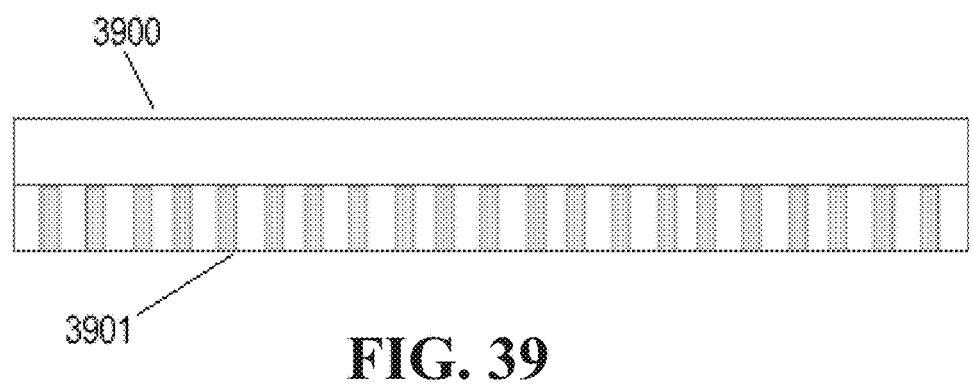

Alternatively, once the polymer/nanotube material is formed, the original substrate (upon which the carbon nanotube forest was grown) can be processed using multiple successive patterning and processing steps to expose holes in the substrate that connect to at least some of the nanotubes in the nanotube forest. For instance, FIG. 38 shows a nanotube forest/substrate, which is a nanotube forest (having nanotubes 3805) on substrate 3804. FIG. 39 shows an embedded nanotube forest/substrate 3900, which is the nanotube forest/substrate 3800 with the nanotube forest embedded in a polymer 3901.

Figure 40:
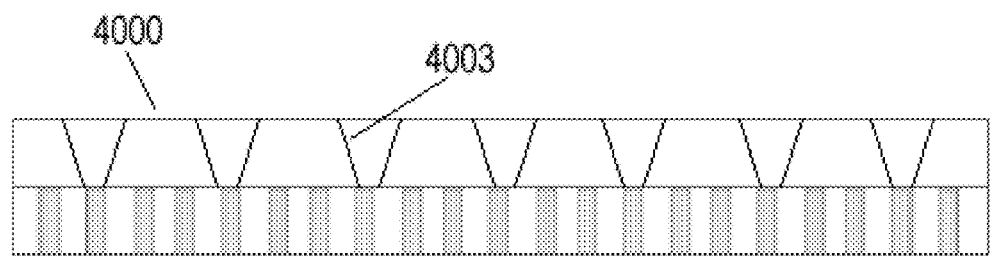

FIG. 40 shows the material composition 4000, which is the embedded nanotube forest/substrate 3900 with shaped depressions 4003 formed on some of the embedded nanotubes 3805. Provided the other ends of the embedded nanotubes 3805 having shaped depressions are opened (such as by patterning and processing steps) to provide for the flow of gas molecules between the two faces of the material composition 4000, material composition 4000 can be used as a material composite utilized in the present invention.

Figure 41:
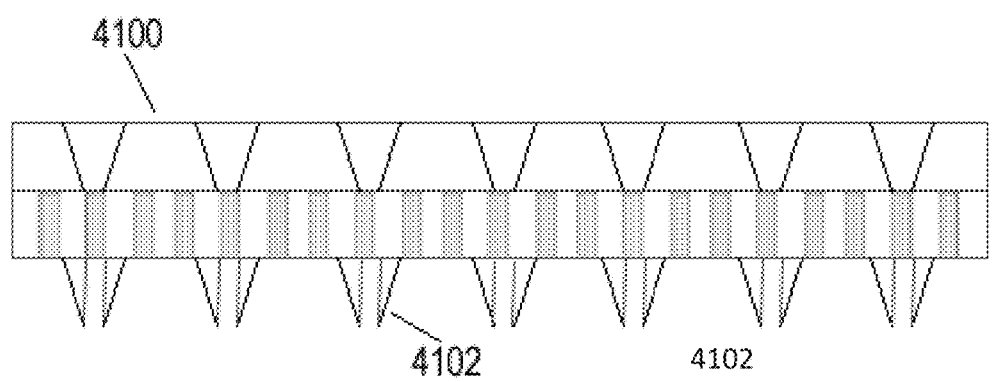

FIG. 41 shows the material composition 4100, which is the material composition 4000 with shaped rises 4102 formed on some of the embedded nanotubes 3805 (which are the same embedded nanotubes to which the shaped depressions 4003 were formed upon). Again, this provides that both ends of these particular nanotubes 3805 are opened and provides for the flow of gas molecules between the two faces of the material composition 4100. Material composition 4100 can thus also be used as a material composite utilized in the present invention.

Nanoscale Gaseous Material Filtering and/or Pump Uses

There are an outstanding array of applications and used for the nano filtering and/or pumping material and systems that these can be incorporated into. Such uses include:

As direct motive force, "sails" which apply direct force in the direction pointed, would move ships, wheeled vehicles, airplanes.

Direct drive fans, similar to turbine blades, could move electric generators, power conveyors or machines.

Direct lift would make feasible airplanes, helicopters, even cars, which fly without moving wings or blades.

The material composition can be operable as a motive force device (as pumping gas produces an equal and opposite force on the pump device). The material composition can be operable as a lifting surface (as pumping gas downward produces an equal and opposite upward force on the pump device)

Such applications would be virtually silent, making a wind noise at most.

Direct compression of air can be stored, or be used to power heat engines (which are powered by the heat of the air).

These applications can be performed with no external fuel, using the heat energy from the sun, stored in the air.

Such devices of the present invention are a class of static nano shapes designed to filter air, vapor or other gaseous state material, and/or pump air, vapor or gaseous material, based on selectively directing the random particles making up the air, vapor or gaseous state material.

Such devices are, generally, sheets of material, or planer material, that can be combined into other shapes as needed.

Such device can be powered by heat energy in the atmosphere, which came from solar power, and is available 24 hours a day worldwide, even in arctic regions.

Such devices can require no fuel source other than heat in the air.

Such devices can provide motive force for machines, vehicles, lifting surfaces, air turbines, heat engines (powered by atmospheric heat), and power generation.

Carbon nanotubes can be utilized in the devices as the carbon nanotubes are suitable building blocks.

Such devices can be used to filter gaseous materials based on molecular size.

Such devices can create a pressure difference between planer sides.

Such devices can create pressure differences capable of providing motive force in any direction without relative motion (such as airplane wings), or relative wind motion, while in the atmosphere.

Such devices can cause air to be compressed, without additional energy being added, using only energy already in the air.

Such devices can be used to store energy, store air or other vapors.

Such devices can be used in chemical separation of gases, including air, humidification, dehumidification.

Such devices can provide lift for very large masses to the rarified regions of the atmosphere.

The method of using the material of the present invention can include positioning the material (and device in which the materials is incorporated) in a single environment of gas molecules. The gas can include air. The method can cause net flow of the gas. The method can cause a net opposing force on the material/device proportional to the net flow of the gas.

Figure 42:
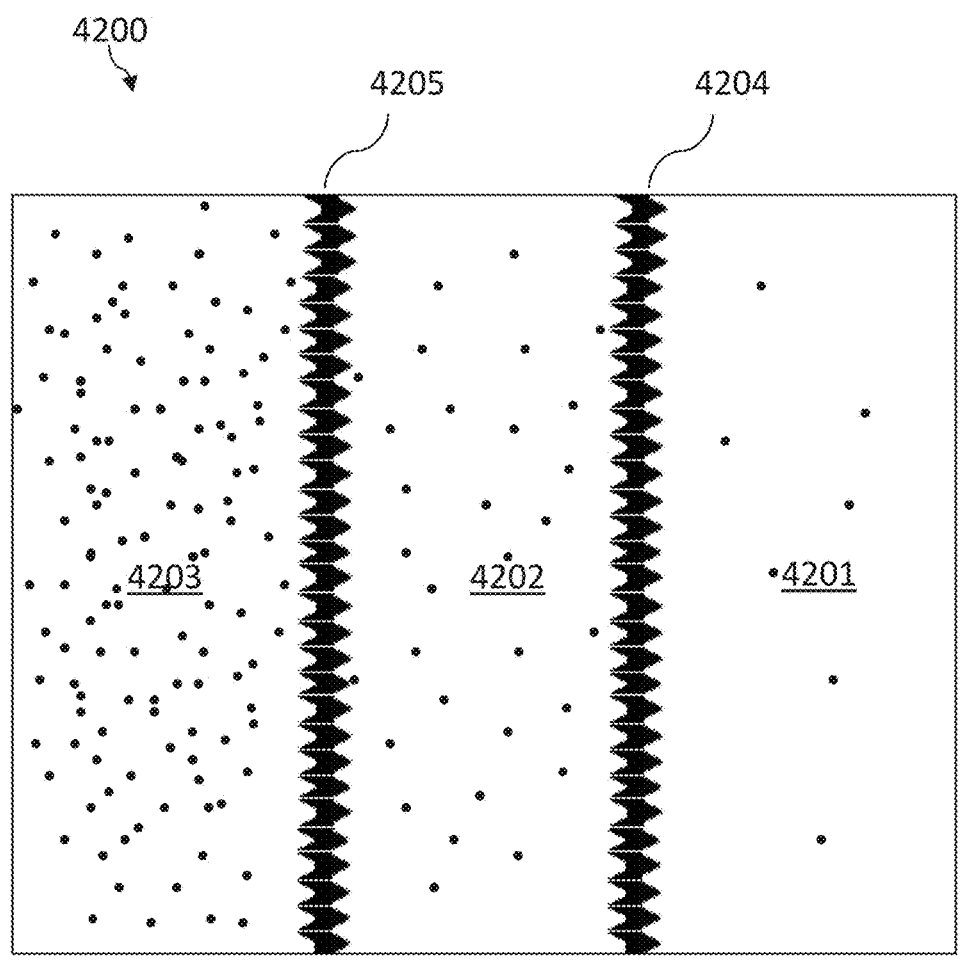
FIG. 42 is an illustration of a system using multi-layers of the material utilized in the present invention, in which the multi-layers are positioned planar to one another.

FIG. 42 shows system 4200 using layers 4204 and 4205 of the materials described above that are positioned planar to one another. Layers 4204 and 4205 are dividers that separate into three environments, namely environments 4201, 4202, and 4203. Similar as discussed above for FIGS. 25-30, the layers 4204 and 4205, will preferentially allow molecules to migrate from environment 3801 to environment 4202 to environment 4203.

Figure 43:
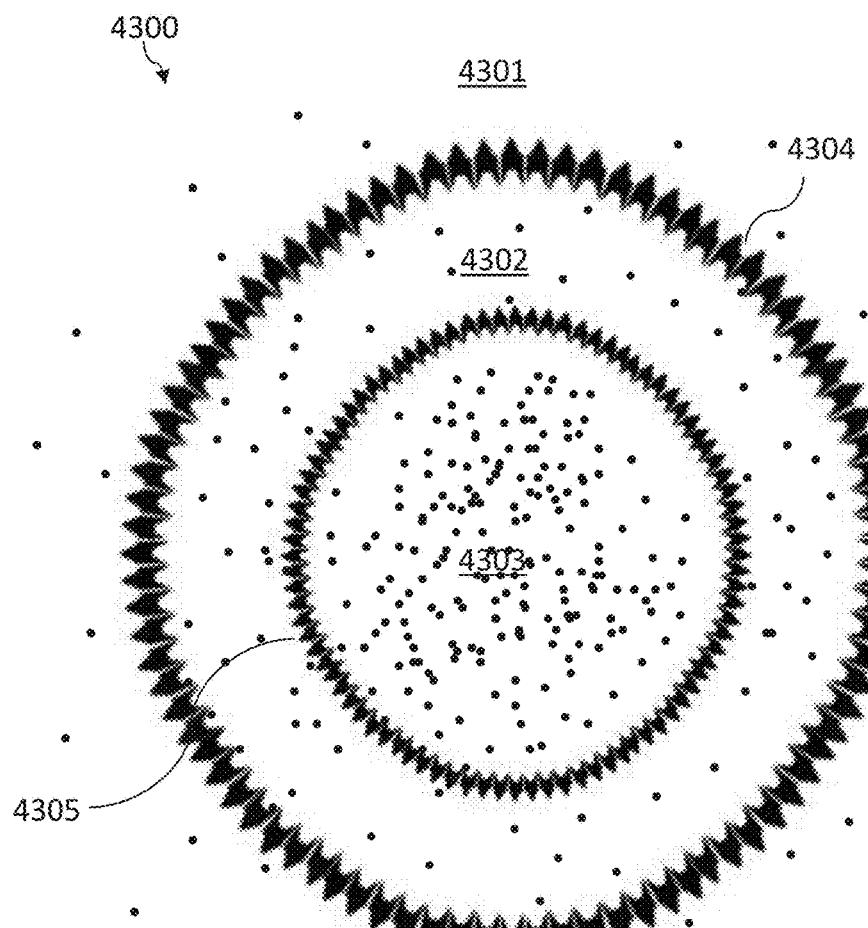
FIG. 43 is an illustration of a system using multi-layers of the material utilized in the present invention, in which the multi-layers are positioned radially to one another (i.e., the multilayers are in concentric tubular form).
Figure 44:
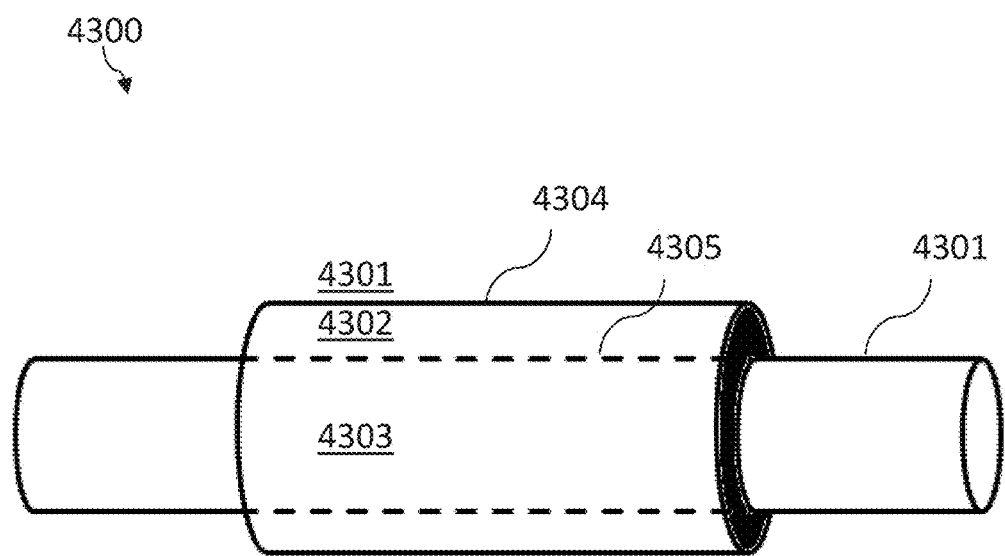
FIG. 44 is an illustration of the tubular-radially layers shown in FIG. 43 from a perspective taken from the side along the longitudinal axis of the tubular materials.

FIG. 43 shows system 4300 using layers 4304 and 4305 of the materials described above that are positioned radially to one another (i.e., the multilayers are in concentric tubular form). FIG. 44 shows the tubular-radially layers 4304 and 4305 from a perspective taken from the side along the longitudinal axis of tubular-radially layers 4304 and 4305. Layers 4304 and 4305 are dividers that separate into three environment, namely outer environment 4301, annular environment 4302, and tubular environment 4303. Similar as discussed above for FIGS. 25-30, the layers 4304 and 4305, will preferentially allow molecules to migrate from outer environment 4301 to annular environment 4302 to tubular environment 4303. Tubular environment 4303 can be connected to conduit 4401 (shown in FIG. 44) to allow the molecules that preferentially migrated into tubular environment 4303 to flow from system 4300.

The system can use multiple-layers of the materials described above (such as tens of hundreds of layers). By placing them in a concentric fashion, the relative pressure differential between any two layers can be held low such that lower strength materials (like plastic or other polymers) can be utilized.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

The disclosures of all patents, patent applications, and publications cited herein are hereby incorporated herein by reference in their entirety, to the extent that they provide exemplary, procedural, or other details supplementary to those set forth herein.

What is claimed is:

1. A material composition comprising;
   (a) a material having a first side and second side, wherein
      (i) the material has a plurality of nano-sized perforations between the first side and the second side, and
      (ii) the nano-sized perforations having an inner diameter that can provide for a gas molecule to traverse through the nano-sized perforations between the first side of the material and the second side of the material; and
   (b) at least one plurality of structure types incorporated above the plurality of the nano-sized perforations, wherein the at least one plurality of structure types is selected from the group consisting of
      (i) a plurality of depressions incorporated above the plurality of the nano-sized perforations on the first side of the material, wherein
         (A) the depressions in the plurality of depressions each is tapered from a depression cross-sectional area at the first side to the inner diameter of one of the nano-sized perforations, and
         (B) the depression cross-sectional area at the first side is (I) at least two times a cross-sectional area of the inner diameter of the one of the nano-sized perforations and (II) at most a cross-sectional area in which gas molecules of air at standard temperature and pressure interacting with the depressions can behave as a cloud of particles and cannot behave as a fluid,
      (ii) a plurality of rises incorporated above the plurality of the nano-sized perforations on the second side of the material, and
      (iii) a combination thereof,
   (c) wherein the at least one plurality of structure types are positioned upon the material such that the material composition is capable of preferentially permitting the traversal of the gas molecules through the nano-sized perforations from a first region on the first side to a second region on the second side, wherein
      (i) the first region is at a same or at a lower pressure than the second region, and
      (ii) the preferential permitting the traversal of the gas molecules is at migration ratio from the first side to the second side that is greater than 1 to 1.

2. The material composition of claim 1, wherein the first side of the material has the plurality of depressions.

3. The material composition of claim 2, wherein
   (a) the material comprises nanotubes within, above, and/or below the perforations,
   (b) first ends of the nanotubes are opened toward the first side of the material,
   (c) second ends of the nanotubes are opened toward the second side of the material, and
   (d) the nanotubes have an inner diameter that can provide for a gas molecule to traverse through the nanotubes from the first side of the material to the second side of the material.

4. The material composition of claim 2, wherein the material composition is capable of being used as a gas molecule filter.

5. The material composition of claim 2, wherein the material composition is capable of being used as a gaseous material pump.

6. The material composition of claim 2, wherein the plurality of nano-sized perforations comprise a plurality of rows of nano-sized perforations.

7. The material composition of claim 2, wherein the migration ratio is at least 1.0001 to 1.

8. The material composition of claim 7, wherein in the migration ratio is at least 3 to 1.

9. The material composition of claim 2, wherein the at least one plurality of structure types are positioned upon the material such that the material composition capable of sustaining a sustainable densities ratio between the second side and the first side of at least 1.0001 to 1.

10. The material composition of claim 9, wherein the sustainable densities ratio is at least 3 to 1.

11. The material composition of claim 1, wherein
 (a) the first side of the material has the plurality of depressions; and
 (b) the second side of the material has the plurality of rises.

12. The material composition of claim 1, wherein the migration ratio is at least 1.0001 to 1.

13. The material composition of claim 12, wherein in the migration ratio is at least 3 to 1.

14. The material composition of claim 1, wherein the at least one plurality of structure types are positioned upon the material such that the material composition is capable of sustaining a sustainable densities ratio between the second side and the first side of at least 1.0001 to 1.

15. The material composition of claim 14, wherein the sustainable densities ratio is at least 3 to 1.

16. The material composition of claim 1, wherein
 (a) the material comprises nanotubes within, above, and/or below the perforations,
 (b) first ends of the nanotubes are opened toward the first side of the material,
 (c) second ends of the nanotubes are opened toward the second side of the material, and
 (d) the nanotubes have an inner diameter that can provide for a gas molecule to traverse through the nanotubes from the first side of the material to the second side of the material.

17. The material composition of claim 1, wherein the material composition is capable of being used as a gas molecule filter.

18. The material composition of claim 1, wherein the material composition is capable of being used as a gaseous material pump.

19. The material composition of claim 1, wherein the plurality of nano-sized perforations comprise a plurality of rows of nano-sized perforations.

* * * * *